US010986852B2

(12) United States Patent
O'Donnell

(10) Patent No.: US 10,986,852 B2
(45) Date of Patent: Apr. 27, 2021

(54) SYSTEMS AND METHODS OF MAKING COLD PROCESSED JUICE BEVERAGES

(71) Applicant: JuiceDelivery, LLC, San Diego, CA (US)

(72) Inventor: Ryne O'Donnell, San Diego, CA (US)

(73) Assignee: SOL-TI, INC., Dover, DE (US)

( * ) Notice: Subject to any disclaimer, the term of this patent is extended or adjusted under 35 U.S.C. 154(b) by 0 days.

(21) Appl. No.: 16/117,646

(22) Filed: Aug. 30, 2018

(65) Prior Publication Data
US 2019/0059419 A1 Feb. 28, 2019

Related U.S. Application Data

(60) Provisional application No. 62/552,807, filed on Aug. 31, 2017.

(51) Int. Cl.
| | |
|---|---|
| A23L 2/50 | (2006.01) |
| B65D 85/72 | (2006.01) |
| B65D 1/02 | (2006.01) |
| A23L 2/02 | (2006.01) |
| B65B 55/08 | (2006.01) |
| A23B 7/015 | (2006.01) |
| A23L 2/06 | (2006.01) |
| A23L 2/42 | (2006.01) |
| A23L 3/28 | (2006.01) |
| B65B 25/00 | (2006.01) |

(Continued)

(52) U.S. Cl.
CPC ............... *A23L 2/50* (2013.01); *A23B 7/015* (2013.01); *A23L 2/02* (2013.01); *A23L 2/06* (2013.01); *A23L 2/42* (2013.01); *A23L 3/28* (2013.01); *B65B 25/001* (2013.01); *B65B 31/02* (2013.01); *B65B 55/08* (2013.01); *B65B 55/16* (2013.01); *B65D 1/0207* (2013.01); *B65D 85/72* (2013.01)

(58) Field of Classification Search
CPC ............... A23L 2/02–2/06; A23L 2/50; A23L 3/26–3/28; A23L 2/42; B65B 25/001; B65B 31/02; B65B 55/04–55/106; B65B 55/16; B65D 1/0207; B65D 85/72; A23B 7/015
USPC .......... 426/248, 234, 399, 521, 599; 99/451; 422/24
See application file for complete search history.

(56) References Cited

U.S. PATENT DOCUMENTS 2,072,416 A * 3/1937 Berndt ............... A23L 3/28
426/248
2,151,645 A * 3/1939 Stephens ............... A23L 3/28
426/248

(Continued)

OTHER PUBLICATIONS

Juice NPL, Fruit Juice Production Using Ultraviolet Pasteurization: A Review, Mar. 2016, file:///C:/Users/dbecker/Downloads/beverages-02-00022%20(1).pdf (Year: 2016).*

(Continued)

*Primary Examiner* — Drew E Becker
(74) *Attorney, Agent, or Firm* — Knobbe, Martens, Olson & Bear, LLP

(57) ABSTRACT

Methods and systems for making and bottling a juice containing beverage in sealed containers are disclosed. The systems and methods may be performed without using heat-based or pressure-based pasteurization, and yet are still safe to consume and have a commercially viable shelf-life.

20 Claims, 8 Drawing Sheets

(51) Int. Cl.
*B65B 31/02* (2006.01)
*B65B 55/16* (2006.01)

(56) References Cited

U.S. PATENT DOCUMENTS

| | | | | |
|---|---|---|---|---|
| 2,204,131 A * | 6/1940 | Glunz | B65B 55/16 | 426/248 |
| 2,338,388 A * | 1/1944 | Whitman | A23L 3/28 | 250/436 |
| 2,384,778 A * | 9/1945 | Whitman | B08B 9/20 | 250/436 |
| 2,482,507 A * | 9/1949 | Rentschler | A23C 3/07 | 426/248 |
| 2,824,014 A * | 2/1958 | Sperti | A23B 7/015 | 426/248 |
| 2,930,706 A * | 3/1960 | Moulton | A23L 3/28 | 426/616 |
| 3,934,042 A * | 1/1976 | De Stoutz | A23C 3/076 | 426/248 |
| 4,304,224 A * | 12/1981 | Fortney | B01L 1/04 | 128/201.29 |
| 4,716,044 A * | 12/1987 | Thomas | B01D 61/145 | 426/51 |
| 5,069,017 A * | 12/1991 | Fabricius | B65B 55/08 | 422/24 |
| 5,707,594 A * | 1/1998 | Austin | A23L 3/28 | 422/186.3 |
| 5,900,211 A * | 5/1999 | Dunn | A23L 3/26 | 422/24 |
| 6,010,727 A * | 1/2000 | Rosenthal | A23L 2/50 | 426/240 |
| 7,703,262 B2 * | 4/2010 | Till | B65B 55/08 | 250/455.11 |
| 7,963,088 B2 * | 6/2011 | Simpson, Jr. | B65D 1/0276 | 426/399 |
| 2006/0076506 A1 * | 4/2006 | Duthie, Jr. | A23L 3/28 | 250/436 |
| 2009/0081340 A1 * | 3/2009 | Forney | A23L 3/28 | 426/248 |
| 2012/0018375 A1 * | 1/2012 | Scheu | C02F 1/441 | 210/638 |
| 2012/0141322 A1 * | 6/2012 | Fogg | A61L 9/20 | 422/24 |
| 2015/0004056 A1 * | 1/2015 | Fogg | A61L 2/10 | 422/24 |
| 2016/0050946 A1 * | 2/2016 | Childs | A23L 3/28 | 99/451 |
| 2017/0064983 A1 * | 3/2017 | Nazaroff | A23L 2/02 | |

OTHER PUBLICATIONS

UV-C Orange Juice NPL, Microbial, physiochemical and sensory properties of UV-C processed orange juice and its microbial stability during refrigerated storage; Food Science and Technology, vol. 50, Issue 2, Mar. 2013, p. 426-431, Cigdem Uysal Pala and Aysegul Kirca Toklucu (Year: 2013).*

* cited by examiner

| Process parameters | | Reported data for apple cider (variable flow rate) | Estimated data for a flow rate of 60 gal/hr | | | | | | |
|---|---|---|---|---|---|---|---|---|---|
| Parameter | Units | | | | | | | | |
| Power of the UV lamp | Watts | 39 | 87 | 87 | 87 | 87 | 87 | 87 | 87 |
| # low pressure lamps | | 8 | 8 | 8 | 8 | 8 | 8 | 8 | 8 |
| Total input power | Watts | 312 | 696 | 696 | 696 | 696 | 696 | 696 | 696 |
| Quartz Tube transparence | (1=100%...0=0%) | 1 | 1 | 1 | 1 | 1 | 1 | 1 | 1 |
| UVC factor | % | 30% | 32% | 32% | 32% | 32% | 32% | 32% | 32% |
| UVC output power of the lamp | Watts | 12 | 28 | 28 | 28 | 28 | 28 | 28 | 28 |
| Number of the UV tubes in series | | 1 | 1 | 2 | 3 | 4 | 5 | 6 | |
| Total UVC power | Watts | 93.6 | 224.0 | 448.0 | 672.0 | 896.0 | 1120.0 | 1344.0 | |
| Flow Rate | gallons/hour | variable flow rate per light sensor readings | 60 | 60 | 60 | 60 | 60 | 60 | |
| Flow Rate | Min, m3/s | 0.000105 | 6.31E-05 | 6.31E-05 | 6.31E-05 | 6.31E-05 | 6.31E-05 | 6.31E-05 | |
| | Max, m3/s | 0.00021 | | | | | | | |
| Total energy per volume | Max, J/m3 | 2971429 | 11033025 | 22066050 | 33099075 | 44132100 | 55165125 | 66198151 | |
| | min, J/m3 | 1485714 | | | | | | | |
| Total energy per volume | Max kJ/L | 2.97 | 11.03 | 22.07 | 33.10 | 44.13 | 55.17 | 66.20 | |
| UVC energy per volume, | Max, J/m3 | 891429 | 3550859 | 7101717 | 10652576 | 14203435 | 17754293 | 21305152 | |
| | Min, J/m3 | 445714 | | | | | | | |
| UVC energy input per pass | kJ/L | 0.89 | 3.55 | 7.10 | 10.65 | 14.20 | 17.75 | 21.31 | |
| Volume of 1 tube | gallons | | 0.047 | 0.047 | 0.047 | 0.047 | 0.047 | 0.047 | |
| Pass (exposure) time | s | 1.2-1.8 | 2.82 | 5.64 | 8.46 | 11.28 | 14.1 | 16.92 | |
| Number of passes | | 1 | 1 | | | | | | |
| Incident UV intensity (max) | mW/cm2 | NA | 20 | 20 | 20 | 20 | 20 | 20 | |
| Incident UV dose | mJ/cm2 | 39.5 | 56.4 | 112.8 | 169.2 | 225.6 | 282 | 338.4 | |
| Absorption factor for apple cider | | 0.3546 | | | | | | | |
| Absorbed dose per pass (est.) | mJ/cm2 | 14 | 20.00 | 40.00 | 60.00 | 80.00 | 100.00 | 120.00 | |

FIG. 4A

| Process parameters | | Reported data for apple cider (variable flow rate) | Estimated data for a flow rate of 80 gal/hr | | | | | |
|---|---|---|---|---|---|---|---|---|
| Parameter | Units | | | | | | | |
| Power of the UV lamp | Watts | 39 | 87 | 87 | 87 | 87 | 87 | 87 |
| # low pressure lamps | | 8 | 8 | 8 | 8 | 8 | 8 | 8 |
| Total input power | Watts | 312 | 696 | 696 | 696 | 696 | 696 | 696 |
| Quartz Tube transparence | (1=100%...0=0%) | 1 | 1 | 1 | 1 | 1 | 1 | 1 |
| UVC factor | % | 30% | 32% | 32% | 32% | 32% | 32% | 32% |
| UVC output power of the lamp | Watts | 12 | 28 | 28 | 28 | 28 | 28 | 28 |
| Number of the UV tubes in series | | 1 | 1 | 2 | 3 | 4 | 5 | 6 |
| Total UVC power | Watts | 93.6 | 224.0 | 448.0 | 672.0 | 896.0 | 1120.0 | 1344.0 |
| Flow Rate | gallons/hour | variable flow rate per light sensor readings | 80 | 80 | 80 | 80 | 80 | 80 |
| Flow Rate | Min, m3/s | 0.000105 | 8.41E-05 | 8.41E-05 | 8.41E-05 | 8.41E-05 | 8.41E-05 | 8.41E-05 |
| | Max, m3/s | 0.00021 | | | | | | |
| Total energy per volume | Max, J/m3 | 2971429 | 8274769 | 16549538 | 24824306 | 33099075 | 41373844 | 49648613 |
| Total energy per volume | min, J/m3 | 1485714 | | | | | | |
| Total energy per volume | Max kJ/L | 2.97 | 8.27 | 16.55 | 24.82 | 33.10 | 41.37 | 49.65 |
| UVC energy per volume, | Max, J/m3 | 891429 | 2663144 | 5326288 | 7989432 | 10652576 | 13315720 | 15978864 |
| | Min, J/m3 | 445714 | | | | | | |
| UVC energy input per pass | kJ/L | 0.89 | 2.66 | 5.33 | 7.99 | 10.65 | 13.32 | 15.98 |
| Volume of 1 tube | gallons | | 0.047 | 0.047 | 0.047 | 0.047 | 0.047 | 0.047 |
| Pass (exposure) time | s | 1.2-1.8 | 2.115 | 4.23 | 6.345 | 8.46 | 10.575 | 12.69 |
| Number of passes | | 1 | | | | | | |
| Incident UV intensity (max) | mW/cm2 | NA | 20 | 20 | 20 | 20 | 20 | 20 |
| Incident UV dose | mJ/cm2 | 39.5 | 42.3 | 84.6 | 126.9 | 169.2 | 211.5 | 253.8 |
| Absorption factor for apple cider | | 0.3546 | | | | | | |
| Absorbed dose per pass (est.) | mJ/cm2 | 14 | 15.00 | 30.00 | 45.00 | 60.00 | 75.00 | 90.00 |

FIG. 4B

| Process parameters | | Reported data for apple cider (variable flow rate) | Estimated data for a flow rate of 100 gal/hr | | | | | |
|---|---|---|---|---|---|---|---|---|
| Parameter | Units | | | | | | | |
| Power of the UV lamp | Watts | 39 | 87 | 87 | 87 | 87 | 87 | 87 |
| # low pressure lamps | | 8 | 8 | 8 | 8 | 8 | 8 | 8 |
| Total input power | Watts | 312 | 696 | 696 | 696 | 696 | 696 | 696 |
| Quartz Tube transparence | (1=100%...0=0%) | 1 | 1 | 1 | 1 | 1 | 1 | 1 |
| UVC factor | % | 30% | 32% | 32% | 32% | 32% | 32% | 32% |
| UVC output power of the lamp | Watts | 12 | 28 | 28 | 28 | 28 | 28 | 28 |
| Number of the UV tubes in series | | 1 | 1 | 2 | 3 | 4 | 5 | 6 |
| Total UVC power | Watts | 93.6 | 224.0 | 448.0 | 672.0 | 896.0 | 1120.0 | 1344.0 |
| Flow Rate | gallons/hour | variable flow rate per light sensor readings | 100 | 100 | 100 | 100 | 100 | 100 |
| Flow Rate | Min, m3/s | 0.000105 | 1.05E-04 | 1.05E-04 | 1.05E-04 | 1.05E-04 | 1.05E-04 | 1.05E-04 |
| | Max, m3/s | 0.00021 | | | | | | |
| Total energy per volume | Max, J/m3 | 2971429 | 6619815 | 13239630 | 19859445 | 26479260 | 33099075 | 39718890 |
| | min, J/m3 | 1485714 | | | | | | |
| Total energy per volume | Max, kJ/L | 2.97 | 6.62 | 13.24 | 19.86 | 26.48 | 33.10 | 39.72 |
| UVC energy per volume, | Max, J/m3 | 891429 | 2130515 | 4261030 | 6391546 | 8522061 | 10652576 | 12783091 |
| | Min, J/m3 | 445714 | | | | | | |
| UVC energy input per pass | kJ/L | 0.89 | 2.13 | 4.26 | 6.39 | 8.52 | 10.65 | 12.78 |
| Volume of 1 tube | gallons | | 0.047 | 0.047 | 0.047 | 0.047 | 0.047 | 0.047 |
| Pass (exposure) time | s | 1.2-1.8 | 1.692 | 3.384 | 5.076 | 6.768 | 8.46 | 10.152 |
| Number of passes | | 1 | 20 | 20 | 20 | 20 | 20 | 20 |
| Incident UV intensity (max) | mW/cm2 | NA | | | | | | |
| Incident UV dose | mJ/cm2 | 39.5 | 33.84 | 67.68 | 101.52 | 135.36 | 169.2 | 203.04 |
| Absorption factor for apple cider | | 0.3546 | | | | | | |
| Absorbed dose per pass (est.) | mJ/cm2 | 14 | 12.00 | 24.00 | 36.00 | 48.00 | 60.00 | 72.00 |

FIG. 4C

| Process parameters | | Reported data for apple cider (variable flow rate) | Estimated data for a flow rate of 120 gal/hr | | | | | |
|---|---|---|---|---|---|---|---|---|
| Parameter | Units | | | | | | | |
| Power of the UV lamp | Watts | 39 | 87 | 87 | 87 | 87 | 87 | 87 |
| # low pressure lamps | | 8 | 8 | 8 | 8 | 8 | 8 | 8 |
| Total input power | Watts | 312 | 696 | 696 | 696 | 696 | 696 | 696 |
| Quartz Tube transparence | (1=100%..0=0%) | 1 | 1 | 1 | 1 | 1 | 1 | 1 |
| UVC factor | % | 30% | 32% | 32% | 32% | 32% | 32% | 32% |
| UVC output power of the lamp | Watts | 12 | 28 | 28 | 28 | 28 | 28 | 28 |
| Number of the UV tubes in series | | 1 | 1 | 2 | 3 | 4 | 5 | 6 |
| Total UVC power | Watts | 93.6 | 224.0 | 448.0 | 672.0 | 896.0 | 1120.0 | 1344.0 |
| Flow Rate | gallons/hour | variable flow rate per light sensor readings | 120 | 120 | 120 | 120 | 120 | 120 |
| Flow Rate | Min, m3/s | 0.000105 | 1.26E-04 | 1.26E-04 | 1.26E-04 | 1.26E-04 | 1.26E-04 | 1.26E-04 |
| | Max, m3/s | 0.00021 | | | | | | |
| Total energy per volume | Max, J/m3 | 2971429 | 5516513 | 11033025 | 16549538 | 22066050 | 27582563 | 33099075 |
| | min, J/m3 | 1485714 | | | | | | |
| Total energy per volume | Max kJ/L | 2.97 | 5.52 | 11.03 | 16.55 | 22.07 | 27.58 | 33.10 |
| UVC energy per volume, | Max, J/m3 | 891429 | 1775429 | 3550859 | 5326288 | 7101717 | 8877147 | 10652576 |
| | Min, J/m3 | 445714 | | | | | | |
| UVC energy input per pass | kJ/L | 0.89 | 1.78 | 3.55 | 5.33 | 7.10 | 8.88 | 10.65 |
| Volume of 1 tube | gallons | | 0.047 | 0.047 | 0.047 | 0.047 | 0.047 | 0.047 |
| Pass (exposure) time | s | 1.2-1.8 | 1.41 | 2.82 | 4.23 | 5.64 | 7.05 | 8.46 |
| Number of passes | | 1 | | | | | | |
| Incident UV intensity (max) | mW/cm2 | NA | 20 | 20 | 20 | 20 | 20 | 20 |
| Incident UV dose | mJ/cm2 | 39.5 | 28.2 | 56.4 | 84.6 | 112.8 | 141 | 169.2 |
| Absorption factor for apple cider | | 0.3546 | | | | | | |
| Absorbed dose per pass (est.) | mJ/cm2 | 14 | 10.00 | 20.00 | 30.00 | 40.00 | 50.00 | 60.00 |

FIG. 4D

SYSTEMS AND METHODS OF MAKING COLD PROCESSED JUICE BEVERAGES

INCORPORATION BY REFERENCE TO ANY PRIORITY APPLICATIONS

Any and all applications for which a foreign or domestic priority claim is identified in the Application Data Sheet as filed with the present application are hereby expressly incorporated by reference under 37 CFR 1.57. This application claims the benefit of U.S. Provisional Patent Application No. 62/552,807, filed Aug. 31, 2017, entitled "SYSTEMS AND METHODS OF MAKING COLD PROCESSED JUICE BEVERAGES," the content of which is hereby expressly incorporated by reference in its entirety.

BACKGROUND

The present disclosure relates to bottling beverages that includes juice from fruits and/or vegetables. More particularly, systems, devices, and methods disclosed herein can be used to create bottled beverages in glass containers that are not subjected to heat pasteurization nor subjected to high pressure pasteurization and yet are still safe to consume and have a commercially viable shelf-life.

Juice from fruits and/or vegetables are highly perishable. In the U.S., the FDA requires a minimum 5-log reduction of the most resistant microorganism of public health significance identified as the pertinent pathogen under a Hazard Analysis and Critical Control Point ("HACCP") plan. The target microorganisms are dependent on the juice product and process. For acidic juice *E. coli, Salmonella* and *Cryptosporidium parvum* may occur. In lower-acid juices, such as carrot juice, *C. botulinum* may be the pathogen hazard of concern.

The European Chilled Food Federation ("ECFF") provides guidance for producing chilled foods in Europe. According to ECFF recommendations, heat-treated chilled food should have a 6 log reduction of either *L. monocytogenes* or cold growing *C. botulinum*.

Traditionally, the shelf-life stable juice products are made using thermal pasteurization ("TP"). Low temperature long time ("LTLT") and high temperature short time ("HTST") treatments are the most commonly used techniques for juice pasteurization. Other non-thermal pasteurization methods have been proposed. Such methods include high hydrostatic pressure ("HHP"), high pressure homogenization ("HPH"), pulsed electric field ("PEF"), and ultrasound ("US"). Unfortunately, TP may cause substantial changes to the nutritional content and flavor of juice containing beverages.

High pressure processing ("HPP") is a cold pasteurization technique for juices where the juice is first sealed in plastic, flexible, and water-resistant packaging, and then are exposed to a high level of hydrostatic pressure (e.g. pressure transmitted by water) of up to 600 MPa/87,000 psi for a few seconds to a few minutes. HPP is not compatible with glass containers.

More recently, ultraviolet (UV-C at 253.7 nm) technology has been implemented. However, due to the physicochemical characteristics of fruit juice, the use of UV-C technology to adequately achieve at least a 5 log reduction of pertinent pathogens in the juice without adversely affecting flavor, aroma, appearance, and nutritional value is highly unpredictable.

SUMMARY

Particular implementations of the subject matter described in this disclosure can be implemented to realize one or more of the following potential advantages, among others. This disclosure enables one to bring juice drinks to market that are packaged in glass containers while preserving natural flavors and retaining (e.g. not significantly altering) naturally occurring colors, enzymes, nutrients, and the like. The disclosed techniques can minimize any physical changes to the juice extracted from whole fruits and vegetables. Thus, the natural pH, vitamins, polyphenols, color, and antioxidant activity of juice can be maintained. The original organoleptic qualities and sensory response from extracted juice can also be retained, which may result in a greater sensory response from consumers (e.g., a more appealing taste, smell, appearance, and texture).

Consumers prefer glass containers as opposed to plastic containers because, among other reasons, glass containers are more easily recyclable and are thus more environmentally friendly. Consumers also prefer the flavor and aroma of juice in glass containers. The potential for leaching of chemicals from a plastic container is also eliminated by using glass instead of plastic. Glass bottles may be perceived as containing a higher quality product. Glass bottles are also more rigid and easier to hold.

TP and HPP treatments alter the physical and chemical properties of juice. Such treatments thus affect the flavor and nutritional characteristics of the juice. While UV-C treatment can also alter the physical and chemical properties of juice, such techniques can be engineered to alter the juice to a far lesser extent than TP and HPP. The terms "light sterilization" or "light filtration" or "light-filtered" and the like may be more appealing to certain customers segments as well. Similarly, terms such as "cold-processed" or "cold-packaged" or "cold-produced" may also be used because the juice is kept cold throughout the process.

In some implementations, a particular mix or blend of juice and UV-C treatments have been found to result in at least a 5-log reduction in the pertinent pathogen under the HACCP plan for the juice. In some aspects, the juice is 100% from fruits and vegetables. In some aspects, the fruits and vegetables are certified organic.

In some implementations, the temperature of the juice does not exceed 50° F. during the entire process. In some aspects the temperature of the juice does not exceed 45° F. during the entire process. In some aspects the temperature of the juice does not exceed 41° F. during the entire process. In some aspects the temperature of the juice does not exceed 35° F. during the entire process.

In some aspects, the juice is subjected to UV-C light in an amount, such that the juice has properties that meet standards set by an appropriate regulatory body (e.g., by the U.S. Food and Drug Administration ("FDA") or European Chilled Food Federation ("ECFF")). A juice having such properties is considered to meet the standards regardless of whether the regulatory body has provided official notification to that effect. The juice may then be bottled in glass bottles or other similar rigid containers. The bottles may be sterilized. The bottles may be sterilized in an aseptic bottling line. The aseptic bottling line may be in contained in a pressurized atmosphere (greater than room pressure) such that pathogens are inhibited from entry into the aseptic bottling line. The pressurized atmosphere may be a substantially enclosed area that is pressurized with HEPA filtered air. The sterilized bottles may be rinsed and then filled with unheated, UV-C treated juice in the aseptic bottling line contained in the pressurized atmosphere. The rinse water may be water that is purified by reverse osmosis ("RO water").

The filled glass bottles may be dosed with liquid nitrogen and capped with sterilized lids. In this way, the juice is enclosed in a positively pressurized sealed container that helps prevent the ingress of pathogens. In addition, head space and oxygen levels in any potential head space are reduced. Sterilization of the bottles, filling, dosing with liquid nitrogen, and capping, may all be completed in the aseptic bottling line contained in a pressurized atmosphere. When the combination of the disclosed steps are performed, the juice in the glass bottles may be approved for consumption by humans and may have a refrigerated shelf-life greater than 35 days. In some aspects, the refrigerated shelf-life greater than 90 days or more. In some aspects, the refrigerated shelf-life greater than 105 days or more.

In some implementations, a method of making and bottling a juice containing beverage in a sealed rigid container without heat-based or pressure-based pasteurization includes one or more of the following steps. The method may include sterilizing at least one container. The container may be a rigid container. The container may be a glass bottle. A liquid may be exposed to UV-C light such that at least a 5 log reduction in microbes is achieved. The liquid may be exposed to the UV-C light by flowing the liquid through a passageway. UV-C light may be passed through the passageway in a direction that is normal to the direction of the liquid flow. The liquid may be exposed to the UV-C light while the liquid flows by the UV-C light. The flow of the liquid may be turbulent. The Reynolds number attributable to the flow may be greater than 2,200. The liquid may comprise at least 10% juice by % volume. The method may also include depositing at least a portion of the liquid in the at least one rigid container. The rigid container may then be sealed. The liquid may be at a temperature of 50° F. or less during the entire method. The liquid in the sealed container may have a shelf-life of at least 35 days when stored at or below 41° F.

In some aspects, the liquid consists of 100% juice. The liquid may comprise no more than 30% by volume of apple cider. The liquid may comprise no more than 40% by volume of apple cider. The liquid may comprise at least 20% cucumber juice. The liquid may comprise no more than 20% juice from citrus fruits.

In some aspects, the liquid is kept at a temperature of about 45° F. or less during the entire method. In other aspects, the liquid is kept at a temperature of about 41° F. or less during the entire method. The liquid in the sealed container may have a shelf-life of at least 40 days, or at least 50 days, or at least 90 days, or at least 100 days, or at least 120 days, or at least 150 days when stored at or below 41° F. or a shelf-life that is a time period existing within a range defined by any two of the aforementioned time periods when stored at or below 41° F.

In some aspects, the sterilization is performed in a pressurized HEPA air filtered environment. The depositing may also be performed in a pressurized HEPA air filtered environment. The liquid may be exposed to at least 42 mJ/cm$^2$ of UV-C light, or at least 56 mJ/cm$^2$ of UV-C light, or at least 70 mJ/cm$^2$ of UV-C light, or at least 84 mJ/cm$^2$ of UV-C light or an amount of UV-C light that is within a range defined by any two of the aforementioned amounts of light.

In some implementations, a system for making and bottling a juice containing beverage in sealed glass containers without using heat-based or pressure-based pasteurization, comprises at least one press configured to extract juice from fruits and vegetables. The system may also include a UV-C treatment device. The UV-C treatment device may be configured to expose extracted juices to an amount of UV-C light projected through the extracted juices and across a path length of no more than 2 mm. The amount of UV-C light exposure may be sufficient to achieve a 5 log reduction in microbes. The system may also include an aseptic sterilization and bottling line. The aseptic sterilization and bottling line may be housed within a pressured and substantially sterile environment. The aseptic sterilization and bottling line may be configured to sterilize glass bottles, deposit the extracted and UV treated juices in the bottles, and cap the filled bottles. The system may be configured such that the extracted liquid is kept at a temperature of 50° F. or less throughout the process.

The amount sufficient to achieve a 5 log reduction in microbes may be an applied dose of UV-C light of at least 40 mJ/cm$^2$, or at least 60 mJ/cm$^2$ of UV-C light, or at least 80 mJ/cm$^2$ of UV-C light, or at least 100 mJ/cm$^2$ of UV-C light, or at least 120 mJ/cm$^2$ of UV-C light or an amount of UV-C light that is within a range defined by any two of the aforementioned amounts of light.

In some implementations, a method of making and bottling a juice containing beverage in a sealed glass container without heat-based or pressure-based pasteurization, comprises one or more of the following steps. The method may include sterilizing at least one glass bottle. The method may include exposing a liquid to UV-C light such that at least a 5 log reduction in microbes is achieved. The liquid may comprise no more than 40% apple cider, at least 20% cucumber juice, and at least 1% kale juice. The method may include depositing at least a portion of the liquid in the at least one glass bottle and sealing the glass bottle. The liquid may be kept at temperature of 50° F. or less during the entire method. The liquid in the sealed bottle may have a shelf-life of at least 30 days when stored at or below 41° F.

In some aspects, the liquid consists of 100% juice. The liquid may comprise at least 10% kale juice. The liquid may comprise at least 10% spinach juice. The liquid may comprise no more than 10% citrus juice.

BRIEF DESCRIPTION OF THE DRAWINGS

The illustrated embodiments of the disclosed system and components are intended to illustrate, but not intended to limit, the described inventions. From figure to figure, the same reference numerals have been used to designate the same components of an illustrated embodiment. Notably, the figures provided herein are not drawn to any particular proportion or scale, and one of skill will appreciate that many variations can be made to the illustrated embodiments. In addition, the steps or blocks in any flow charts and the like are illustrative only. In some aspects, the blocks or steps may be rearranged, repeated or omitted. The following is a brief description of each of the drawings.

FIGS. 4A-4D are tables showing how the UV-C dose applied to a liquid can be adjusted and calculated. For example, the tube volume, flow rate, and light source, may all be adjusted to achieve the desired UV-C treatment amounts.

DETAILED DESCRIPTION

Figure 1A:
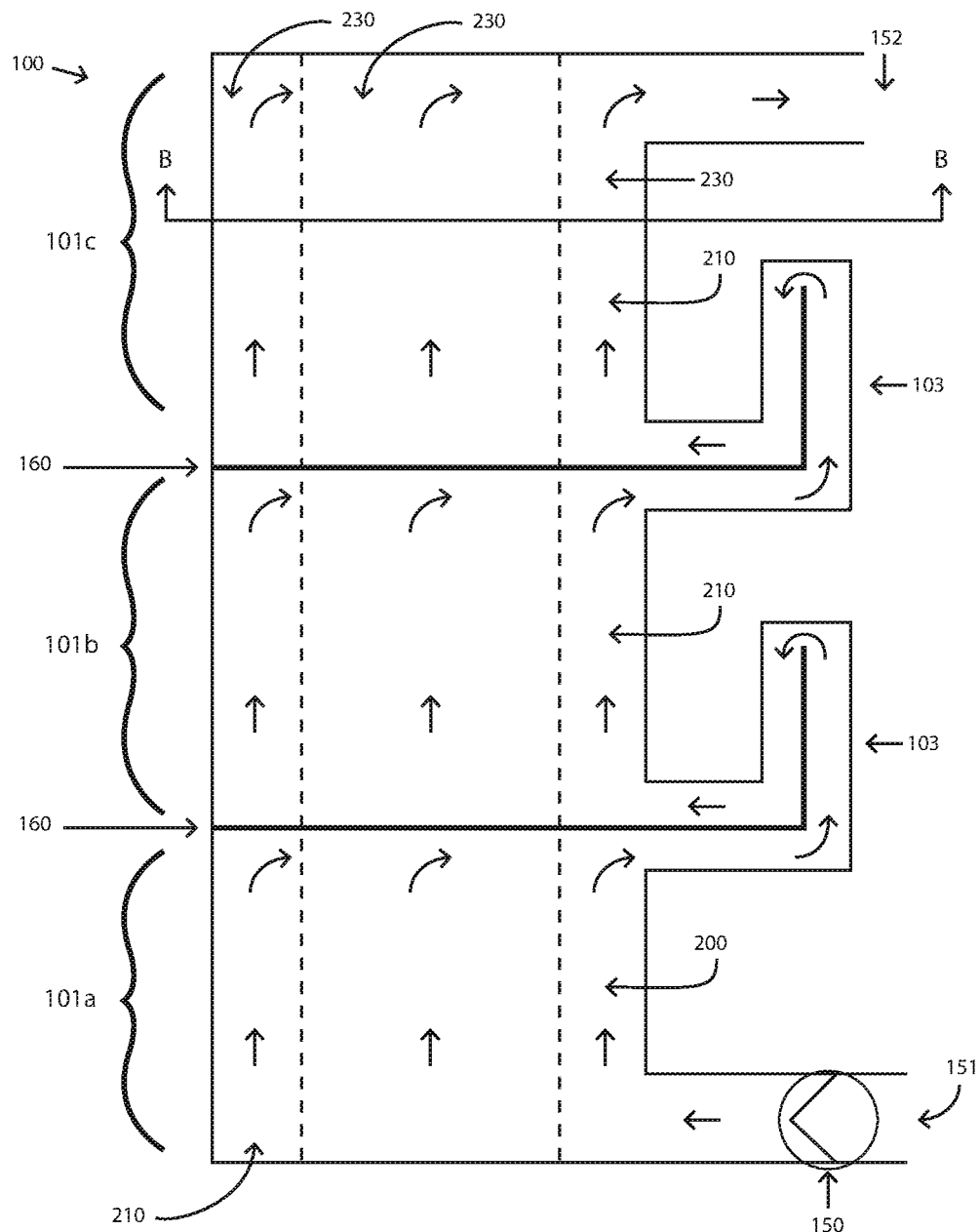
FIG. 1A is a schematic, side, cross-sectional view of a UV-C treatment column according to one implementation.

Applicant overcame many technical hurdles to achieve a glass bottled, light filtered, cold crafted, organic, 100% juice beverage. Surprisingly, Applicant discovered that by altering a commercially available UV-C treatment device, formulating the proper juice recipes, and employing an aseptic bottling line with nitrogen dosing, a substantially unaltered 100% juice beverage, having improved sensory responses from customers, could be made and could have a refrigerated shelf-life of over 35 days. Depending on the beverage makeup, the refrigerated shelf-life (at about 41° F.) may be at least 25 days, or at least 30 days, or at least 35 days, or at least 40 days, or at least 45 days, or at least 50 days, or at least 55 days, or at least 60 days, or at least 65 days, or at least 70 days, or at least 75 days, or at least 80 days, or at least 85 days, or at least 90 days, or at least 95 days, or at least 100 days, or at least 105 days, or at least 110 days, or at least 115 days, or at least 120 days or a time period existing within a range defined by any two of the aforementioned time periods.

Cold-pressed juice can be made using a hydraulic press that extracts juice from whole fruits and vegetables. Without TP or HPP, cold-pressed juice can be stored in a refrigerator for up to 5 days, depending on the acidity of the juice and other factors. As used herein, 100% juice refers to unaltered and undiluted aqueous liquid that is expressed or extracted from fruits or vegetables (filtered or unfiltered).

TP allows beverages to be packaged in plastic or glass containers. Such packaged juice may have a shelf-life of up to 150 days. However, the high temperatures (e.g., about 280° F.) can have an adverse effect on flavor and other marketable qualities. In some aspects, flavor is reduced by 50% or more when TP is used. TP may also result in less phenolic antioxidants in the juice. In some aspects, phenolic antioxidants are reduced by 50% or more when TP is used. TP may also result in a juice that is lighter in color than juices that are not subject to TP. For example, color may be reduced by up to 40%. TP may degrade and/or denature enzymes. In some aspects, whole enzymes in the juice are reduced by 50% or more and in some aspects 100% of the enzymes are destroyed. TP may also result in a reduction of nutrients in the juice. In some aspects, up to 30% less nutrients are present in TP treated juices when compared to untreated juices. TP may also oxidize the juice. Such oxidization may consume naturally occurring antioxidants in the juice.

As discussed above, HPP requires the use of petroleum based plastic packaging. The juice inside the packaging is then exposed to pressures of at least 87,000 PSI. Thus, glass bottles and similar rigid containers are not compatible with HPP. However, HPP may also result in less phenolic antioxidants in the juice. In some aspects, phenolic antioxidants are reduced by 70% or more when HPP is used. HPP may also result in a juice that is lighter in color than juices that are not subject to HPP. For example, color may be reduced by up to 30%. HPP may degrade and/or denature enzymes. In some aspects, whole enzymes in the juice are reduced by 50% or more and in some aspects 90% of the enzymes are destroyed. HPP may also oxidize the juice. Such oxidization may consume naturally occurring antioxidants in the juice.

Seeking to achieve a marketable juice in the most natural state possible, Applicant sought to avoid TP and HPP and thus turning to UV-C treatment. UV-C treated juice performs comparably to fresh juice in consumer satisfaction surveys and UV-C treated juice performs significantly better than heat treated juices in consumer satisfaction surveys.

Applicant's process is sufficient for the juice to receive FDA approval but is not excessive—thus minimizing any adverse effects on the nutritional value, color, taste, aroma, of the juice while also making safe to drink even after many days in cold storage.

Applicant's process can preserve 90-100% of the flavor, can retain 90-100% of phenolic acids (and, in some aspects, may even increase phenolic acids by 10%), can retain 90-100% of the color, can retain 90-100% of the enzymes, and can retain 80-90% of the nutrients. Rough estimates for the loss of nutrients, phenols, color, enzymes, and flavor in comparison to untreated juice are shown below in Table 1.

TABLE 1

| | Nutrients/vitamins | Phenolic antioxidants | Color | Enzymes | Flavor |
|---|---|---|---|---|---|
| Untreated Juice (%) | 100 | 100 | 100 | 100 | 100 |
| Thermal pasteurization (e.g., 75-80° C.) (%) | 50-70 | 50-100 (varies with treatment time) | 60 | 0-30 | 50 |
| HPP (e.g. about 600 MPa) (%) | 70-90 | 30-120 (varies with pressure and time) | 70-100 | 10-80 | 100 |
| UV-C Treatment (%) | 80-90 | 85-110 | 90-100 | 85-100 | 80-100 |

Adequate UV-C treatment of juice is complex and unpredictable. On the one hand, the UV-C treatment must sufficiently destroy microorganisms such that the juice is safe and stable over time. But the effect of UV-C treatment on microorganisms varies from inter-species, intra-species, strain, medium, density and even their size. Excessive treatment with UV-C may affect the color, taste, and nutritional content of the juice.

Fruit juice has a range of optical, chemical, and physical properties that influence UV-C light transmittance, dose delivery, and momentum transfer. Thus, UV-C treatment can cause microbial inactivation to different extents depending on the makeup of the juice that is treated (color, opaqueness, transmissivity, absorbance, vitamin content, pH, or sugar content (Brix), etc.). The turbidity, relative particle sizes in the juice, viscosity, and amounts of total soluble solids and suspended solids can all influence the UV-C treatment process. UV-C treatment is often limited by its ability to adequately penetrate the juice. Depending on the juice, 90% of UV-C treatment may be absorbed within the first 1-mm from the surface of the UV-C light source.

The chemical makeup of the juice also affects the UV-C treatment process. For example, vitamins A, C, B2, B12, D, E and K, carotenes, folic acid, tryptophan, sugars, and unsaturated fatty acids are 'light-sensitive' and can degrade with the exposure of UV-C light. Vitamin C may be a particularly strong absorber of UV-C light, even at the low concentrations. Sugars (e.g., fructose, sucrose, and glucose) may also be particularly strong absorbers of UV-C light even at low concentrations. In some implementations, the Applicant has found that results are best when the UV-C treated juice contains less than about 20% by volume of juice from citrus fruits (having relatively high levels of Vitamin C). In addition, Applicant has found that successful UV-C treatment of juice that contain even small amounts of carrot or beet juice is very difficult if not impossible.

The type and amount of UV-C treatment may, in some instances, have a deleterious effect on nutritional content, flavor, and color. For example, UV-C treatment may oxidize chemical compounds in the juice, such as ascorbic acid and Vitamin C, reducing the amount of nutrients in the juice. Oxidation of Vitamin C and absorption of UV-C by melanins in the juice from the UV-C treatment may also affect the juice color (e.g. it may reduce juice pigmentation). Thus, overexposure to the UV-C light may lead to adverse effects on the quality and nutritional values of the juices.

UV-C treatment may partially or completely denature enzymes in the juices as well. While some enzymes in juice may be desirable, others are associated with enzymatic browning (e.g. polyphenol oxidase). Pectic enzymes (e.g. pectin methylesterase and polygalacturonase) proteins may cause "cloud-loss" in fruit juice.

Flow conditions during UV-C treatment may also affect the physicochemical properties of juice that is treated. Hydrodynamical stresses may break apart larger particulate matter in the juice which may lead to an increase in small particles and cloudiness. Suspended particles in liquid flowing through a UV-C treatment device may scatter, block, or absorb UV light and decrease its desired effectiveness.

The particular UV-C treatment system and process has an effect on the overall desired result of the UV-C treatment process. Power levels, processing times, UV-C path length, flow rate, and Reynolds number associated with the flow can be varied. Such variations influence the effectiveness of a device's ability to inactivate microbes. The variations also influence the amount of physical and chemical changes to the juice (affecting the overall juice quality).

The FDA requires that, in the context of treating juice, the UV radiation source must consist of low pressure mercury lamps emitting 90 percent of the emission at a wavelength of 253.7 nanometers (2,537 Angstroms) and that a turbulent flow through columns has a minimum Reynolds number of 2,200.

While UV-C treatment has previously been used in the context of apple ciders, its use has proven to be unpredictable and often times ineffective for use with other juice types. Successful use of UV technology may be dependent on one or more of the UV source(s) (e.g. the power, intensity, and wavelength), the geometry of the UV-C flow treatment device, the path length of the light through the liquid, the flow rate of the liquid, the Reynolds number of the flow rate, and the specific juices that are treated.

There are commercially available products that are used to treat apple cider with UV-C in order to achieve at least a 5 log reduction of microorganisms (e.g. $E.\ coli$ O157:H7) and to exceed FDA guidelines. Apple cider, as used herein, means juice extracted from whole apples that is unaltered and undiluted with any other liquid (filtered or unfiltered). For example, units can be purchased for UV-C treatment of apple cider (e.g. from a company known as CiderSure). Using only apple cider eliminates many variables attributable to the liquid that is treated with UV-C. Such variables have been discussed herein.

CiderSure units include one or more flow columns. Fluid is flowed through the column and exposed to UV light. The columns are often connected in parallel to allow for faster overall flow rates and lower processing times. Each column contains a cylindrical quartz tube. The cylindrical quartz tube contains a plurality of cylindrical UV-C blubs that extend through the interior of the cylindrical quartz tube and the about the axial center of the column. More specifically, within the cylindrical quartz tube are eight germicidal low-pressure mercury lamps placed concentrically positioned along the interior of the cylindrical quartz tube.

This cylindrical quartz tube is then surrounded by a cylindrical steel tube. The steel tube and the quartz tube are separated by a gap (e.g., a 1-20 mm gap, or a 1-5 mm gap, or in some aspects about a 3 mm gap, in some aspects about a 2 mm gap, in some aspects about a 1 mm gap, in some aspects about a 0.75 mm gap). Fluid flows upward along the cylindrical quartz tube in this gap space between the interior cylindrical quartz tube and the exterior steel tube. In some aspects, contact areas of the flow path include physical features to increase turbulence. That is to say that the exterior surface of the inner quartz tube of the interior surface of the steel tube may include indentations and/or protrusions (e.g. they may have an uneven or roughened surface) to increase the turbulent flow through the gap.

The unit includes a pump that pumps the liquid up along the quartz tube and through the gap space between the quartz tube and the steel tube. The unit also includes at least one sight gauge and a UV sensor where the intensity of the UV light that passes through the gap space is read. Depending on the intensity of the transmitted light that is detected, the unit adjusts the flow rate by changing the flow rate of the pump. The less light that is detected as passing through the flowing liquid, the slower the flow rate. Such machines commonly fault (e.g. the pump stops or cannot flow at the slower flow rates) when juices other than 100% apple cider is used.

In some aspects, the CiderSure columns include two sight gauges. One sight gauge is position near the bottom of the column and the other is placed near the top. Each sight gauge includes a UV sensor. The UV sensors periodically read the intensity of the light that is detected through the fluid flow path. In some aspects, the UV sensors are read every 50 ms. A control circuit can use the readings to adjust the flow rate by adjusting the pump speed. The control circuit may help ensure that the apple cider is sufficiently exposed to the UV light in order to achieve a 5 log reduction of $E.\ Coli$ O157:H7. In some aspects, the UV readings are used to automatically adjust the flow rate through the column to ensure that at least a 14 mJ/cm$^2$ exposure level is achieved throughout the entire sample of apple cider. In some aspects, the UV readings are used to automatically adjust the flow rate through the column to ensure that an at least a 14.32 mJ/cm$^2$ exposure level. In general, for apple cider, an 11-16 mJ/cm$^2$ exposure level is required.

A standard CiderSure unit is set up to measure the UV level in the fluid being processed and to adjust the flow so that the fluid spends enough time in the chambers to be exposed to the targeted dose of UV energy. This calculation may be based on one or more UV sensor readings, combined and averaged, together with some constants related to the physical properties of the process column components.

A simplified formula may be stated as:

Target Flow=[(UV Sensor Value)*(Flow Time Constant)/(Target Exposure)]*(Units and Scaling Factors)

Typically, the UV sensor reading is in microwatts per square centimeter, the flow time constant is in units of gallon seconds per hour and is essentially the volume of the space in between the inner quartz tube and the outer steel tube times 3,600 seconds per hour, the target exposure is the desired dose of UV exposure in microjoules per square centimeter, and the units and scaling factors are other adjustments that are made, primarily attenuation by the quartz rod.

The flow may be regulated by using the pulses from the flow meter, scaled by the proper factors, to calculate the actual flow in gallons per hour and then adjusting the pump speed to achieve the "Target Flow."

In some implementations, there is no lower limit on the calculated Target Flow so it is possible, if the juice is dark enough, to calculate a flow that is below the level that the machine can regulate. This condition causes a "Flow Fault" even though there is no failure. In some aspects, the lower flow limit the sensor is about 0.75 Gal/min or about 45 Gal/hr.

In some aspects, the average intensity within the sample is calculated by an integration of Beer's law over the sample depth. In general, UV dose is calculated by multiplying the irradiance by the exposure time. Irradiance can be found by multiplying the sensor readings by a radial factor, reflection factor, absorption factor (e.g. 0.3546 for apple cider). A sensor adjustment factor can also be used (e.g. 5.88 in some aspects).

In some aspects, the exposure time is calculated by dividing the column volume by the flow rate. The bulbs in the CiderSure columns, for example, deliver about 18-20 mw/cm² of energy to pure water passing through one column of the device.

The UV dose delivered by a particular UV-C treatment system, may be determined using energy data information (from the manufacturer or measured) attributable from the UV source, system, and product characteristics. The general form of the UV dose (or fluence) calculation is given below (Equation 1):

$$E = I \cdot t \quad \text{(Equation 1)}$$

E (UV dose), I (irradiance, e.g., W/cm²), t (time, e.g. s).

In continuous UV systems, the total applied UV dose ($E_{UV}$), either in energy per unit volume (e.g. J/L) of liquid (Equation 2) or energy per unit area (e.g. J/cm2) (Equation 3), is calculated based on the total output power of the UV source ($P_{UV}$), typically in Watts. Such data may be supplied by the manufacturer or by the equipment energy consumption information.

The time used in the calculation is generally the fluid average residence time in the UV system. $E_{UV}$ is independent of the material being irradiated and of the configuration of the system. It is important for researchers reporting UV dose in continuous systems to supply all the necessary system parameters required for dose calculation in both kJ/L and J/cm². Inter-conversion between these units will allow for proper comparison of UV dose values among commercial applications.

$$E_{UV} = (P_{UV} \cdot t)/(V_{AV}) = (L_N \cdot P_{UV})/V_{AV} \quad \text{(Equation 2)}$$

$$E_{UV} = P_{UV}/A_1 \cdot t \quad \text{(Equation 2)}$$

The total output power in the UV-C range ($P_{UV-C}$) is typically 30-33% of the total wattage for low-pressure mercury and amalgam lamps.

The incident UV dose ($H_0$, e.g. J/cm²), is often reported and can be defined as the energy that is actually incident on the surface of the product at the interface with the chamber, sleeve or tube. $H_0$ is calculated based on the incident UV irradiance or fluence rate ($I_0$, e.g. W/cm²) on the surface of the product (Equation 4). $I_0$ may be provided by the manufacturer, but its value may also be also measured with a radiometer at a controlled distance from the UV source and the measurement has to be checked periodically in order to take into account the decrease in lamp power during its lifetime. The time used in the calculation is the total exposure time of the fluid in seconds.

$$H_0 = I_0 \cdot t \quad \text{(Equation 4)}$$

The absorbed UV dose ($H_r$, e.g. J/cm²), takes into account parameters of the system and of the liquid product. $H_r$ is the radiant UV energy that is actually absorbed by the medium and its constituents (homogeneous fluid) and is available for driving a photo-reaction. $H_r$ is calculated for continuous and batch systems based on the absorbed UV irradiance or fluence rate ($I_r$, e.g. W/cm² by the product (Equation 5).

$$H_r = I_r \cdot t \quad \text{(Equation 5)}$$

Absorbed UV irradiance or fluence rate ($I_r$) in a continuous flow UV system can be calculated using Equation 6.

$$I_r = I_0(r_0/r) \cdot \exp[-\alpha_\lambda \cdot (r - r_0)] \quad \text{(Equation 6)}$$

Where r is a radius of the chamber (e.g. in cm), r0 is the radius of the UV lamp quartz sleeve (e.g. in cm), $\alpha\lambda$ (e.g. in nm/cm) is decadic absorption coefficient or absorbance for a 1-cm path length at a given wavelength ($\lambda$, e.g. in nm).

Evaluation of energy and UV dose data can be performed based on the calculations of the total applied energy, UVC energy, incident UV dose and absorbed UV dose.

The following assumptions can be made for the calculation of UV dose in the CiderSure UV unit: (1) the UV transmittance of juice products is assumed close to zero and inactivation of bacteria occurs when organisms reached the internal surface of the annular gap; (2) the incident UV dose on the internal surface of annular gap is considered as the maximum amount of UV dose delivered to bacteria, and (3) exposure time to UV light is equal to the average residence time of the bacteria in the exposure zone.

As discussed herein, the CiderSure (FPE Inc., Macedon, N.Y.) units use low-pressure mercury UV lamps to expose a thin film of juice flowing through columns under turbulent conditions. A single column in a unit consists of three individual chambers connected in tandem with outside tubing. Fluid is pumped through an annular gap between the inner surface and the outer surface of the quartz sleeve. Eight UV lamps are mounted within the quartz inner cylinder running centrally through all three chambers. The CiderSure model allows using multiple flow rate settings to regulate the UV fluence. In some aspects, the CiderSure pump may be removed and replaced by another pump that can be independently controlled to achieve the desired UV fluence. Sensors monitor the amount of UV light that is being applied to the liquid flowing through the device and a computer interface determines the appropriate flow rate to achieve a significant reduction in the microbial load of the juice/cider based on this UV penetration data. The off-theshelf CiderSure 3500 UV unit is programmed to compensate for differences that may exist in apple cider (e.g. optical properties such as UV absorbance, total solids, and color that can decrease UV penetration).

Various light sources for UV-C light may be utilized. In some aspects, the bulbs have a diameter of about 15 mm, an arc length of about 767 mm, a rated power of about 90 W and a UV output at 254 nm at about 265 uW/cm$^2$. Other commercially available bulbs have a UV output at 254 nm between about 100-400 uW/cm$^2$.

Mechanical characteristics of typical, single column, CiderSure UV units are summarized below in Table 2.

TABLE 2

| Parameter | CiderSure |
|---|---|
| Flow pattern | Thin film, Turbulent |
| Reactor volume, m$^3$ | 0.2172 × 10$^{-3}$ |
| Flow rate, V, m$^3$/s | 1.05-2.1 × 10$^{-4}$ |
| Residence time in 1 column, s | 1-2 |
| Total treatment time, s | Variable |
| Reynolds number | >2,200 |
| Type of UV source | Low pressure mercury, 90% at 254 nm |
| Number of UV sources in 1 module, $L_N$ | 8 |
| Lamp output power, $P_{UV}$, W | 39 |
| Number of columns | 1 (more may be included in parallel but not in series) |

The reported data of UV energy and UV dose values for continuous treatments of apple juice/cider in single column CiderSure3500 are summarized in Table 3.

TABLE 3

UV energy and UV dose in CiderSure3500

| | UV unit | CiderSure 3500 |
|---|---|---|
| | Power (W) | 39 |
| | # Lamps | 8 |
| | Total input power (W) | 312 |
| Tube transparence | (1 = 100% . . . 0 = 0%) | 1 |
| Total UVC output power | UVC factor, % | 30 |
| | Total UVC output (W) | 94 |
| Flow rate (m$^3$/s) | Min | 0.000105 |
| | Max | 0.00021 |
| Total energy per volume (J/m$^3$) | Min | 2971429 |
| | Max | 1485714 |
| UVC energy per volume (J/m$^3$) | Min | 891429 |
| | Max | 445714 |
| UVC energy input per pass (kJ/l) | | 0.89 |
| Pass time (s) | | 1.2-1.8 |
| Number of columns | | 2-10 |
| Incident UV dose (mJ/cm$^2$) | | 39.5 |
| Taget absorbed dose per pass (mJ/cm$^2$) for apple cider | | 14 |

According to Basaran etc. (2004) the average absorbed UV light intensity within the sample in the CiderSure unit was calculated by an integration of Beer's law over the sample depth (0.762 mm). The UV dose was calculated with Equation 4. The absorbed irradiance was determined by multiplying the sensor readings by the radial factor, reflection factor, and the absorption factor, which for the tested apple cider was 0.3546. The inoculated cider was pumped through the UV processing unit and irradiated for 1.2 to 1.9 s.

Figure 1B:
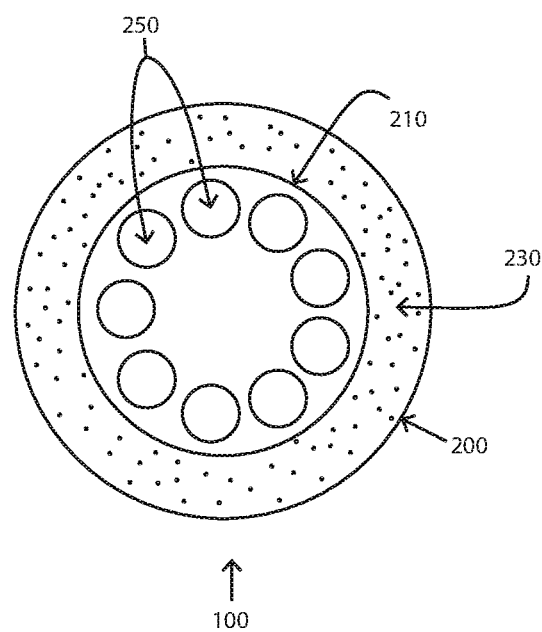
FIG. 1B is a schematic, top, cross-sectional view of the UV-C treatment column of FIG. 1A taken about the line B-B.

FIG. 1A illustrates a schematic side cross-sectional view of a flow column 100 in an exemplary CiderSure device. FIG. 1B is a schematic top down cross-sectional view of the column 100 taken about the line B-B in FIG. 1A. Within the quartz tube 210 are 9 UV bulbs 250. The quartz tube 210 is surrounded by the exterior tube 200. Fluid flows upward through the space or annular gap 230 between the quartz tube 210 and the exterior tube 200. Fluid may enter at the inlet 151 near the bottom of the column 100 and fluid may exit from the outlet 152 near the top of the column 100. The CiderSure column 100 is approximately 3-4 feet in length from top to bottom.

The flow column 100 typically includes three similar sections 101a-101c that are broken up by flow diverters 160. Each of the three sections are about 1 foot in length (e.g. about 25.4 cm in length each). The flow diverters 160 direct the flow into re-circulators 103 (e.g. a bending tube) to add turbulence in order to help mix the fluid as it passes upward through the column 100 (increasing the Reynolds number and preventing laminar flow throughout the entire length of the column). As discussed above, a flow pump 150 can be used to propel the fluid upward through the column. The flow rate of the flow pump 150 may be controlled and adjusted as discussed above. Flow rates may vary between 1-200 gallons/minute. In some aspects, the flow rate may be manually set and held relatively constant for a particular juice.

Applicant approached CiderSure and asked if the CiderSure devices could be used to effectively treat juices that were not 100% apple ciders. In response, Applicant was told that the CiderSure devices would not work in such applications. Surprisingly, Applicant discovered that when multiple CiderSure columns were connected in series, an adequate UV-C treatment was obtained. Applicant found that for most of its juice applications, when 3 CiderSure columns were connected in series, a 5 log reduction was achieved. Other juices required 4 CiderSure columns connected in series. While more than 3-4 columns can be connected in series (e.g. 5, 6, 7, or 8 columns in series), sufficient treatment levels could be obtained using 3-4 columns connected in series without adversely affecting the desired, flavor, texture, and color of the juice.

While the modified CiderSure devices allowed for adequate UV-C treatment for some juice, it was inadequate for other juice. In some aspects, the juice was re-formulated and re-tested multiple times until the desired tasting juice, with the required 5 log reduction was obtained.

When the CiderSure machines are modified, such that more than one column 100 is connected in series, and the columns are set such that a 12-15 mJ/cm$^2$ exposure level, the exposure level may be increased. For example, when two columns are connected in series, a 24-30 mJ/cm$^2$ exposure level may be reached, when three columns are connected in series, a 36-45 mJ/cm$^2$ exposure level may be reached, when four columns are connected in series, a 48-60 mJ/cm$^2$ exposure level may be reached, when five columns are connected in series, a 60-75 mJ/cm$^2$ exposure level may be reached, and when six columns are connected in series, a 72-90 mJ/cm$^2$ exposure level may be reached.

In some aspects, the volume of each column, connected in series, is about 0.047 gallons. The exposure time factor may be about 169 gal sec/hr. The amount of time that the juice is within the UV-C exposure zone of a single column may vary from about 0.5-2 seconds. In some aspects, the flow rate is adjusted such that the juice spends about 1 second in each column. Using the CiderSure lamps, the incident power may be in the range of 18-20 mJ/cm$^2$, this is measured by the sensors and the flow adjusted accordingly.

FIGS. 4A-4D shows, for example, increasing the number of columns from 1 to 6 (in series) at an average flow rate of 60 gal/hr increases the incident UV-C dose from about 40 mJ/cm$^2$ to about 340 mJ/cm$^2$. At higher flow rates, for example at 120 gal/hr, increasing the number of columns from 1 to 6 (in series) at an average flow rate of 60 gal/hr increases the incident UV-C dose from about 30 mJ/cm$^2$ to about 170 mJ/cm$^2$. That is to say, one of skill in the art, knowing the relevant parameters, can determine the applied UV-C light dose and/or the absorbed UV-C light dose and/or the incident UV-C light dose can be determined.

While the modified CiderSure devices allowed for FDA approval, the shelf-life of the juice needed to be extended such that the bottled juices could be successfully brought to a large enough market. Applicant's methods keep the juices cold throughout the entire processing, sterilization, and packaging process—inhibiting microbe growth and preventing the breakdown of the natural occurring nutrients, colors, textures, and flavors. Keeping the liquid relatively cool throughout, and minimizing potential exposure to sources of contamination, was paramount to achieving the desired shelf-lives.

Shelf-life generally refers to the length of time for which a packaged food item remains usable, safe/fit for consumption, and saleable. Refrigerated shelf-life generally refers to the length of time for which a packaged food item remains usable, safe/fit for consumption, and saleable when the item is stored at or below 41° F. Shelf-life or shelf-stability studies are commonly used those of skill in the art to determine and validate the length of time a product retains its quality under certain storage conditions. During the shelf life of a product, the product should be safe to use, should retain the anticipated quality traits that are characteristic of the product, and should meet all nutritional claims that are indicated on the product label.

Applicant commissioned shelf-life studies that were designed to include testing of the recently produced (Day 1) product to determine a baseline value representing the initial (Fresh) quality. An absolute final shelf-life of the product was not conclusively determined at the end of the study. Rather, an acceptable self-life date was provided—representing a time period after which there were low microbial levels and acceptable, taste, aroma, and appearance. Unacceptable microbiological flora was defined as: Aerobic Plate Count≥5,000,000 CFU/g, Lactic Acid Bacteria≥5,000,000 CFU/g, Yeast≥100,000 CFU/g, Mold≥100,000 CFU/g and any Visible Mold Growth.

Figure 2:
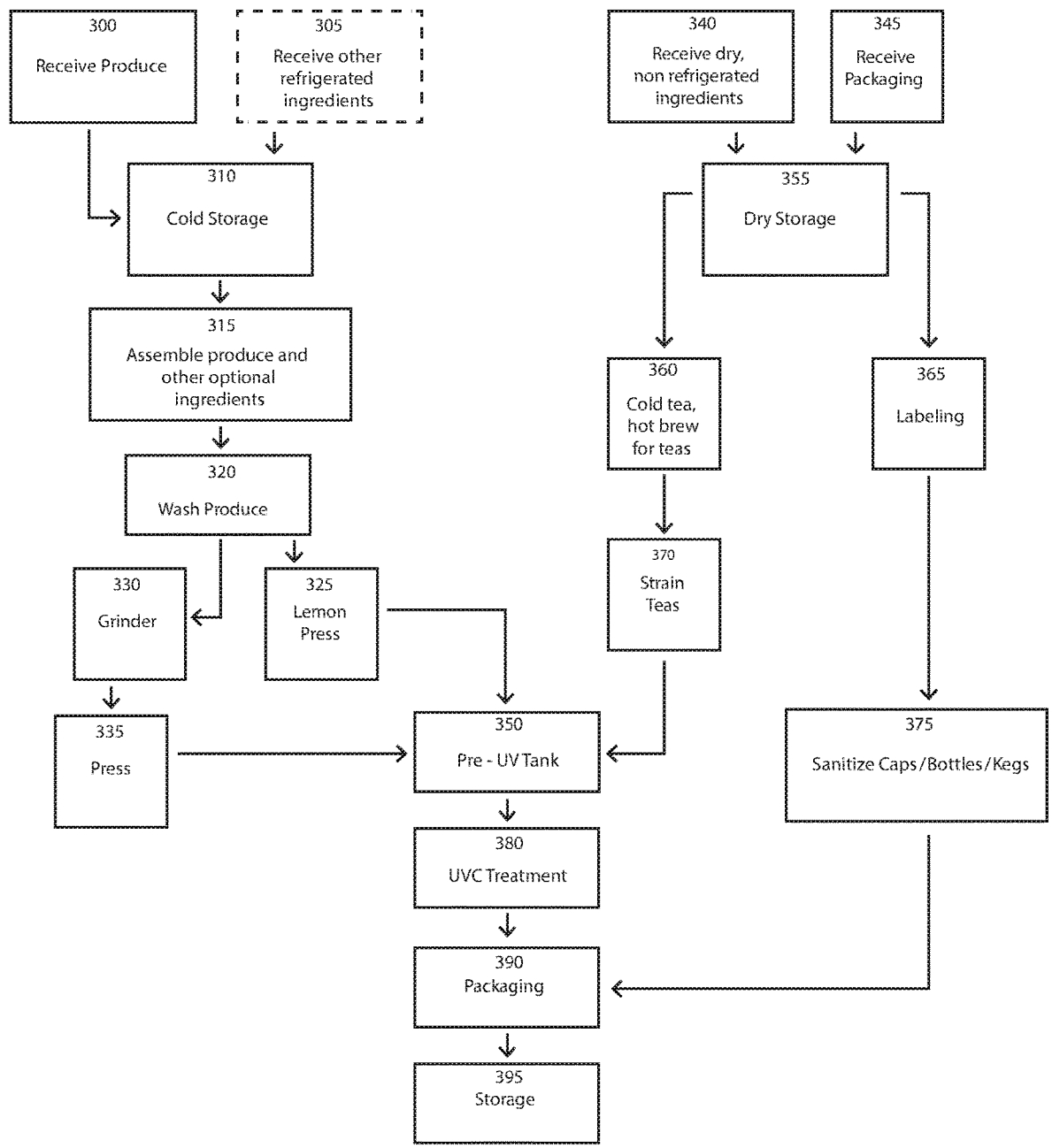
FIG. 2 is an example flow chart illustrating a process of making, treating, and packaging a juice containing beverage.

FIG. 2 is an example flow chart graphically illustrating a method of making a juice containing beverage having an extended shelf life according to one embodiment. Produce may be received at block 300. Other refrigerated ingredients may be optionally received at block 305. Produce and other refrigerated ingredients may be placed in cold storage at block 310. In some aspects, produce and other refrigerated ingredients are stored at 45° F. or below. In some aspects, produce and other refrigerated ingredients are stored at about 40° F. The amounts of produce and optional other ingredients may be assembled at block 315. The produce and optional other ingredients may then be washed at block 320. In some aspects, RO water is used to wash the produce and other ingredients. Depending on the type of produce the method continues at blocks 325, 330, and 335 where lemons are pressed and other produce is ground 330 and pressed 335. In some aspects, a lemon press 325 is used for lemons only and other citrus (e.g. grapefruit and orange) are pressed using a hydraulic cold press 335. Various commercially available cold-press equipment may be used.

In some aspects, the liquid obtained from the blocks 325, 330, and 335 is 100% juice. In some aspects, blocks 325, 330, and 335 are completed in a cold room (e.g. at or below 45° F. or at or below 40° F.). Juice obtained from the cold-press may be filtered and mixed. In some aspects the juice containing beverages are filtered prior to UV-C treatment. In some aspects a 1000-100 micron filter is used. In this way, particulate matter may be removed in order to increase the effectiveness of the UV-C treatment.

The juices may then be stored at block 350 prior to UV-C treatment. The cold-press juice may be stored at or below 45° F. or at or below 40° F. In some aspects, the cold-press juice is stored in a temperature controlled, jacketed, steel tank. In some aspects, the cold-press juice is stored at about 33° F. Any headspace in the holding tank may be filled with nitrogen gas to help reduce oxygenation and prevent contamination. In some aspects, the juice is stored at the coldest temperature possible while remaining in liquid form. The temperature of the liquid will rise as it flows through the UV-C device because the UV-C bulbs produce heat. Thus, by keeping the juice cold, the potential for increases in temperature of the juice above 45° F. during UV-C treatment is eliminated or reduced.

Continuing with FIG. 2, at block 340, dry non-refrigerated ingredients may be received. In some aspects, such ingredients include charcoals, spices, teas, and the like. Packaging, including labels, glass bottles, and lids for the glass bottles may be received at block 345. While glass bottles are preferred for some applications, any container may be utilized. For example, plastic, metal, or ceramic containers may be implemented if desired. Similarly, lids may be made of any desired and suitable materials. Plastic or aluminum lids may be used in some implementations.

Dry non-refrigerated ingredients and packaging may be stored at block 355. Dry ingredients may be used to make hot and cold teas at block 360. Dry ingredients may also include charcoals and spices. Teas may be filtered/strained at block 370. In some aspects, for example in non-100% juice products, teas may be mixed with cold pressed juices and stored at block 350 in the pre-UV-C treatment holding tanks.

Liquid may be moved from holding tanks through the UV-C treatment device at block 380. In some aspects, the UV-C treatment device is a modified CiderSure device discussed above. In some aspects, the UV-C treated juice may then be stored in a post-UV tank (not shown). The post-UV tank may be a temperature controlled, jacketed, steel tank. In some aspects, the cold-press juice in the post-UV tank is stored at about 33° F. Any headspace in the holding tank may be filled with nitrogen gas to help reduce oxygenation and prevent contamination. In some aspects, the juice is stored at the coldest temperature possible while remaining in liquid form. The temperate of the liquid will rise as it is later bottled. However, by keeping the juice as cold as possible, the potential for increases in temperature of the juice above 45° F. is reduced or eliminated.

Turning to block 365, the glass bottles are labeled. The bottles and caps for the bottles are then sterilized and/or sanitized at block 375. In some aspects, the bottles and caps are sterilized without using heat-based sterilization. In this way, the temperature of the bottles does not increase and excessive heat is not transferred to juice that is deposited in the bottles. That is to say, by not using heat sterilization, the juice can be kept relatively cold even during bottling. In some aspects, peracetic acid ("PA") is used to sterilize the bottles. In some aspects, PA is also used to sterilize the caps. In some aspects, the PA concentration is between about 80-120 parts/million.

At block 390, the UV-C treated juice is packaged in the bottles and the caps are sealed to close the bottle openings. In some aspects, the packaging is completed under aseptic conditions and preformed in a HEPA filtered enclosure. In this way, contamination of the juice is greatly reduced and shelf-life is further increased. The bottled juice may be further packaged and stored at a temperature of no greater than 45° F. at block 395. In some aspects, the bottled juice is stored at a temperature 41° F. or less. In general, the "danger zone" for microbial growth is between 41-135° F.

Figure 3:
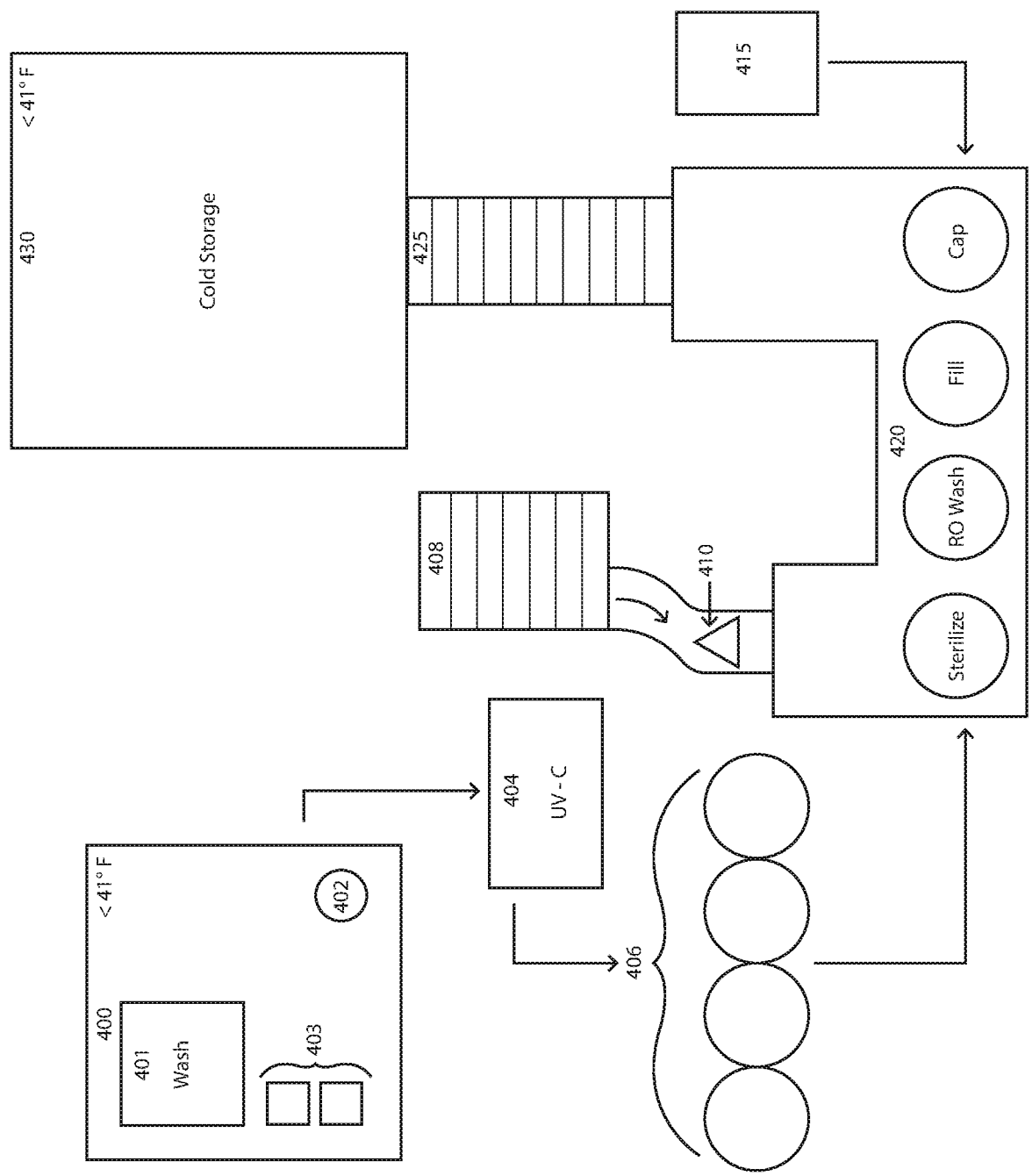
FIG. 3 is a plan view schematic illustrating a process of making, treating, and packaging a juice containing beverage according to one implementation.

FIG. 3 illustrates a schematic, plan view of a juice processing and packaging facility according to one implementation. Cold box 400 may house a produce washer 401, cold press equipment 403 (e.g. juicers and presses), and mixing tanks 402. The cold box may be kept at no more than 45° F. In some aspects, the cold box is kept at no more than 40° F. Produce may be washed, juice may be extracted, filtered, mixed, and then stored prior to UV treatment. In some aspects, the extracted juice may be stored in jacketed, temperature controlled tanks, that are located outside of the cold box 400.

Extracted juices may then be pumped through the UV-C treatment device 404. In some aspects, the juice that flows through the UV-C treatment device 404 does not increase in temperature above 45° F. In some aspects, the juice that flows through the UV-C treatment device 404 does not increase in temperature above 40° F. The treated juice may then be stored in holding tanks 406. The holding tanks 406 may be jacketed, temperature controlled tanks. In some aspects, the holding tanks are configured to store the juice at or below 41° F. The temperature of the juice in the holding tanks may be lowered to 35° F. or less (although above a temperature that would cause frozen solids to form in the juice).

Room temperature bottles may be loaded at loading area 408 and labeled by labeler 410. The bottles may then enter an aseptic washing and filling line 420. The aseptic washing and filling line 420 may comprise a substantially enclosed area that is at an air pressure above the pressure outside of the aseptic washing and filling line 420. The air inside the aseptic washing and filling line 420 may be HEPA filtered air. The bottles may be sterilized within the aseptic washing and filling line 420. In some aspects, the bottles are sterilized with a PA containing solution. In some aspects, the aseptic washing and filling line 420 is configured such that the temperature of the juice does not exceed 50° F.

The bottles may then be washed to remove the sterilization material. In some aspects, the bottles are washed with RO water. Juice from holding tanks 406 may be pumped into the aseptic washing and filling line 420 and into the sterilized and washed bottles. Lids may be sterilized in by lid sterilization unit 415. The sterilized lids may then be sealed to the bottle openings. The filled and sealed bottles may exit on conveyor 425 and stored in cold storage 430. In some aspects, cold storage 430 is configured to keep the bottled liquid a temperature of about 41° F. or less. In some aspects, the temperature of the liquid in the bottles does not rise above 45° F. during bottling.

After use, the modified CiderSure unit is cleaned and sterilized. In some aspects, the unit is first flushed with water. Then, a caustic solution (e.g. a solution having a pH of about 14) is pumped through the modified CiderSure unit. Acid is then typically added to neutralize the caustic solution (e.g. such that the wash solution is reduced to a pH of about 6). The neutralized caustic solution is then pumped through the modified CiderSure unit. In some aspects, an acidic solution is then pumped through the modified CiderSure unit. Following the acidic solution, a water solution is commonly pumped through unit. Next, a sterilizing solution is pumped through the unit. In some aspect, the sterilizing solution comprises PA. A final water wash is the performed. In some aspects, the final water wash is a RO water wash.

Using the above described systems, methods, and devices, Applicant has formulated numerous beverages, verified that the UV-C treatment was sufficient to achieve a 5 log reduction in pathogens without adversely affecting the beverages desired taste, aroma, color, texture, and nutritional content, and conducted shelf-life studies for the beverages. For each beverage, Applicant desired to provide sufficient, but not excessive UV-C treatment.

EXAMPLES

The following examples are provided for illustrative purposes only and are not provided to limit the scope of the claims provided herein.

Example 1

A cold press juice containing, on a % by volume basis, 35% juice from apples, 25% juice from cucumbers, 15% juice from kale, 15% juice from spinach, 5% juice from mint, and 5% juice from lemon was obtained. This 100% juice product was treated with a modified CiderSure unit having 6 columns connected in series. The average flow rate through the 6 columns was between 60-122 gallons/hour. Thus, the total applied dose of UV-C energy was between about 170-340 mJ/cm². The total absorbed UV-C dose was estimated to be between 60-120 mJ/cm2. The results of a validated HACCP study (using *E. coli* ATCC 25922) are shown in Table 4 below.

TABLE 4

| Run # | Count T-0 | Count T-1 | Reduction (log) |
|---|---|---|---|
| 1 | 7.53 | 1.69 | 5.84 |
| 2 | 7.53 | 1.06 | 6.47 |
| 3 | 7.53 | 1.70 | 5.83 |

As can be seen above, at least a 5 log reduction was obtained. The juice quality was not adversely affected. The desired color, aroma, and flavor was also obtained.

A slightly modified juice was formulated according to Table 5 below.

TABLE 5

| Ingredients | Unit | Units for production (1) | % | Shelf-life (approx.) | Average Flow rate through 6 columns in series |
|---|---|---|---|---|---|
| Cucumber | lb | 0.39 | 30 | 35 days | 60-122 g/hr |
| Fuji Apple | lb | 0.39 | 30 | | |
| Kale | lb | 0.24 | 18 | | |
| Lemon | oz | 0.51 | 3 | | |
| Mint | lb | 0.004 | 2 | | |
| Spinach | lb | 0.22 | 17 | | |

The juice was treated and bottled as described above. A shelf-lifestudy was then conducted. The shelf-life study demonstrated that the packaged juice had a shelf-life of at least 39 days.

Example 2

A cold press juice containing, on a % by volume basis, 50% juice from cucumber, 40% juice from pineapple, 8% juice from parsley, and 2% juice from kale was obtained. This 100% juice product was treated with a modified Cider-Sure unit having 6 columns connected in series. The average flow rate through the 6 columns was between 60-122 gallons/hour. Thus, the total applied dose of UV-C energy was between about 170-340 mJ/cm$^2$. The total absorbed UV-C dose was estimated to be between about 60-120 mJ/cm2. The results of a validated HACCP study (using *E. coli* ATCC 25922) are shown in Table 6 below.

TABLE 6

| Run # | Count T-0 | Count T-1 | Reduction (log) |
|---|---|---|---|
| 1 | 7.48 | 1.52 | 5.96 |
| 2 | 7.51 | 1.34 | 6.17 |
| 3 | 7.46 | 1.48 | 5.98 |

As can be seen above, at least a 5 log reduction was obtained. The juice quality was not adversely affected. The desired color, aroma, and flavor was also obtained.

he juice will be bottled as described above. A shelf-life study was then conducted. The shelf-life study demonstrated that the packaged juice had a shelf-life of at least 39 days.

Example 3

A cold press juice containing, on a % by volume basis, 40% juice from apples, 25% juice from cucumber, 5% juice from kale, 5% juice from spinach, 10% juice from romaine lettuce, 5% juice from celery, 3% juice from lemon, 3% juice from ginger, and 3% juice from parsley.

This 100% juice product was treated with a modified CiderSure unit having 6 columns connected in series. The average flow rate through the 6 columns was between 60-122 gallons/hour. Thus, the total applied dose of UV-C energy was between about 170-340 mJ/cm$^2$. The total absorbed UV-C dose was estimated to be between about 60-120 mJ/cm2. The results of a validated HACCP study (using *E. coli* ATCC 25922) are shown in Table 7 below.

TABLE 7

| Run # | Count T-0 | Count T-1 | Reduction (log) |
|---|---|---|---|
| 1 | 6.88 | 0.76 | 6.12 |
| 2 | 6.95 | 0.71 | 6.24 |
| 3 | 7.22 | 1.18 | 6.04 |

As can be seen above, at least a 5 log reduction was obtained. The juice quality was not adversely affected. The desired color, aroma, and flavor was also obtained.

The juice was treated and bottled as described above. A shelf-life study was then conducted. The shelf-life study demonstrated that the packaged juice had a shelf-life of at least 35 days.

Example 4

A cold press juice containing, on a % by volume basis, 90% juice from apples, 4% juice from lemon, and 6% juice from ginger root was obtained. This 100% juice product was treated with a modified CiderSure unit having 6 columns connected in series. The average flow rate through the 6 columns was between 120-148 gallons/hour. Thus, the total applied dose of UV-C energy was between about 140-170 mJ/cm$^2$. The total absorbed UV-C dose was estimated to be between about 60-80 mJ/cm2. The results of a validated HACCP study (using *E. coli* ATCC 25922) are shown in Table 8 below.

TABLE 8

| Run # | Count T-0 | Count T-1 | Reduction (log) |
|---|---|---|---|
| 1 | 7.24 | 1.02 | 6.22 |
| 2 | 6.96 | 0.54 | 6.42 |
| 3 | 6.74 | 0.63 | 6.11 |

As can be seen above, at least a 5 log reduction was obtained. The juice quality was not adversely affected. The desired color, aroma, and flavor was also obtained.

A juice was formulated according to Table 9 below.

TABLE 9

| Ingredients | Unit | Units for production (1) | % | Shelf-life (approx.) | Average Flow rate through 6 columns in series |
|---|---|---|---|---|---|
| Ginger | lb | 0.067 | 6 | 50 days | 120-148 ga/hr |
| Granny Smith Apple | lb | 1.02 | 90 | | |
| Lemon | oz | 0.56 | 4 | | |

The juice was treated and bottled as described above. A shelf-life study was then conducted. The shelf-life study demonstrated that the packaged juice had a shelf-life of at least 52 days.

Example 5

A juice was formulated according to Table 10 below.

TABLE 10

| Ingredients | Unit | Units for production (10) | 1 unit production | % | Shelf-life (approx.) | Average Flow rate through 6 columns in series |
|---|---|---|---|---|---|---|
| Chlorophyll | Tbsp | 10 | 1 | 3 | 90 days | 156-165 ga/hr |
| Aloe | Tbsp | 5 | 0.5 | 2 | | |
| Lemon | oz | 10 | 1 | 5 | | |
| Manple syrup | oz | 2.5 | 0.25 | 2 | | |
| R.O Water | oz | 150 | 15 | 88 | | |

The juice was then treated as described above. The average flow rate through the 6 columns was between 156-165 gallons/hour. Thus, the total applied dose of UV-C energy was between about 135-120 mJ/cm$^2$.

The results of a validated HACCP study (using *E. coli* ATCC 25922) are shown in Table 11 below.

TABLE 11

| Run # | Count T-0 | Count T-1 | Reduction (log) |
|---|---|---|---|
| 1 | 7.48 | 1.42 | 6.06 |
| 2 | 7.53 | 1.44 | 6.09 |
| 3 | 7.45 | 1.42 | 6.03 |

As can be seen above, at least a 5 log reduction was obtained. The juice quality was not adversely affected. The desired color, aroma, and flavor was also obtained.

The juice was then bottled as described above. A shelf-life study was then conducted. The shelf-life study demonstrated that the packaged juice had a shelf-life of at least 90 days.

Example 6

A juice was formulated according to Table 12 below.

TABLE 12

| Ingredients | Unit | Units for production (100) | 1 unit | % | Shelf-life (approx.) | Average Flow rate through 6 columns in series |
|---|---|---|---|---|---|---|
| Lemon | oz | 13 | 0.13 | 8 | 90 days | 118 ga/hr |
| Turmeric | oz | 1 | 0.01 | 0.5 | | |
| Reishi Concentrated | oz | 18 | 0.18 | 10.5 | | |
| Maple Syrup | oz | 8 | 0.08 | 5 | | |
| R.O Water | oz | 130 | 1.3 | 76 | | |

The juice was then treated as described above. The average flow rate through the 6 columns was about 118 gallons/hour. Thus, the total applied dose of UV-C energy was about 170 mJ/cm$^2$. The estimated applied dose of UV-C was about 60 mJ/cm$^2$.

The results of a validated HACCP study (using *E. coli* ATCC 25922) are shown in Table 13 below.

TABLE 13

| Run # | Count T-0 | Count T-1 | Reduction (log) |
|---|---|---|---|
| 1 | 6.77 | 0.40 | 6.37 |
| 2 | 6.89 | 1.03 | 5.86 |
| 3 | 6.74 | 0.02 | 6.72 |

As can be seen above, at least a 5 log reduction was obtained. The juice quality was not adversely affected. The desired color, aroma, and flavor was also obtained.

The juice was bottled as described above. A shelf-life study was then conducted. The shelf-life study demonstrated that the packaged juice had a shelf-life of at least 90 days.

Example 7

A juice was formulated according to Table 14 below.

TABLE 14

| Ingredients | Unit | Units for production (10) | 1 unit production | % | Shelf-life (approx.) | Average Flow rate through 6 columns in series |
|---|---|---|---|---|---|---|
| Coconut Charcoal | g | 0.5 | 0.05 | 0.01 | 90 days | 111-160 ga/hr |
| Lemon | oz | 2 | 0.2 | 11 | | |
| Manple syrup | oz | 1 | 0.1 | 6 | | |
| R.O Water | oz | 15 | 1.5 | 83 | | |

The juice was then treated as described above. The average flow rate through the 6 columns was between 111-160 gallons/hour. Thus, the total applied dose of UV-C energy was between about 120-180 mJ/cm$^2$.

The results of a validated HACCP study (using *E. coli* ATCC 25922) are shown in Table 15 below.

TABLE 15

| Run # | Count T-0 | Count T-1 | Reduction (log) |
|---|---|---|---|
| 1 | 7.48 | 1.42 | 6.06 |
| 2 | 7.53 | 1.44 | 6.09 |
| 3 | 7.45 | 1.42 | 6.03 |

The juice was then treated as described above. As can be seen above, at least a 5 log reduction was obtained. The juice quality was not adversely affected. The desired color, aroma, and flavor was also obtained.

The juice was bottled as described above. A shelf-life study was then conducted. The shelf-life study demonstrated that the packaged juice had a shelf-life of at least 90 days.

Example 8

A juice was formulated according to Table 16 below.

TABLE 16

| Ingredients | Unit | Units for production (1) | % | Shelf-life (approx.) | Average Flow rate through 6 columns in series |
|---|---|---|---|---|---|
| Grapefruit | oz | 3.9 | 68 | 40 days | 40-50 gal/hr |
| Lemon | oz | 1.57 | 27 | | |
| Maple Syrup | Tblsp | 0.56 | 5 | | |

The juice was then treated as described above. The average flow rate through the 6 columns was between 40-50 gallons/hour. Thus, the total applied dose of UV-C energy was between about 400-500 mJ/cm$^2$.

The results of a validated HACCP study (using *E. coli* ATCC 25922) are shown in Table 16 below.

TABLE 17

| Run # | Count T-0 | Count T-1 | Reduction (log) |
|---|---|---|---|
| 1 | 7.50 | 0.93 | 6.57 |
| 2 | 7.49 | 0.99 | 6.50 |
| 3 | 7.51 | 0.96 | 6.55 |

As can be seen above, at least a 5 log reduction was obtained. The juice quality was not adversely affected. The desired color, aroma, and flavor was also obtained.

The juice was bottled as described above. A shelf-life study was then conducted. The shelf-life study demonstrated that the packaged juice had a shelf-life of at least 52 days.

Example 9

A juice was formulated according to Table 18 below.

TABLE 18

| Ingredients | Unit | Units for production (10) | 1 unit production | % | Shelf-life (approx.) | Average Flow rate through 6 columns in series |
|---|---|---|---|---|---|---|
| Cayenne | g | 1 | 0.1 | 0.02 | 90 days | 163-171 ga/hr |
| Lemon | oz | 15.7 | 1.57 | 10 | | |
| Maple Syrup | Tbsp | 5.6 | 0.56 | 1.98 | | |
| R.O Water | oz | 135 | 13.5 | 88 | | |

The juice was then treated as described above. The average flow rate through the 6 columns was between 163-171 gallons/hour. Thus, the total applied dose of UV-C energy was between about 120 mJ/cm².

The results of a validated HACCP study (using *E. coli* ATCC 25922) are shown in Table 19 below.

TABLE 19

| Run # | Count T-0 | Count T-1 | Reduction (log) |
|---|---|---|---|
| 1 | 7.48 | 1.42 | 6.06 |
| 2 | 7.53 | 1.44 | 6.09 |
| 3 | 7.45 | 1.42 | 6.03 |

As can be seen above, at least a 5 log reduction was obtained. The juice quality was not adversely affected. The desired color, aroma, and flavor was also obtained.

The juice was bottled as described above. A shelf-life study was then conducted. The shelf-life study demonstrated that the packaged juice had a shelf-life of at least 90 days.

Example 10

A juice was formulated according to Table 20 below.

TABLE 20

| Ingredients | Unit | Units for production (1) | % | Shelf-life | Average Flow rate through 6 columns in series |
|---|---|---|---|---|---|
| Fuji Apple | lb | 0.97 | 75 | 35 days | 163-171 |
| Granny Smith Apple | lb | 0.32 | 25 | | |

The juice was then treated as described above. The average flow rate through the 6 columns was between 163-171 gallons/hour. Thus, the total applied dose of UV-C energy was between about 120 mJ/cm².

The results of a validated HACCP study (using *E. coli* ATCC 25922) are shown in Table 21 below.

TABLE 21

| Run # | Count T-0 | Count T-1 | Reduction (log) |
|---|---|---|---|
| 1 | 6.8 | 0.65 | 6.15 |
| 2 | 6.93 | 0.18 | 6.75 |
| 3 | 6.89 | 0.18 | 6.71 |

As can be seen above, at least a 5 log reduction was obtained. The juice quality was not adversely affected. The desired color, aroma, and flavor was also obtained.

The juice was bottled as described above. A shelf-life study was then conducted. The shelf-life study demonstrated that the packaged juice has a shelf-life of at least 39 days.

Example 11

A juice was formulated according to Table 22 below.

TABLE 22

| Ingredients | Unit | Units for production (1200) | 1 unit production | % | Shelf-life (approx.) | Average Flow rate through 6 columns in series |
|---|---|---|---|---|---|---|
| Lemon | oz | 1200 | 1 | 6 | 60 days | 165-170 ga/hr |
| Maple syrup | oz | 600 | 0.5 | 3 | | |
| R.O water | oz | 15600 | 13 | 80 | | |
| Goji berry | g | 12000 | 10 | 2 | | |
| Strawberry | g | 48000 | 40 | 9 | | |

The juice was then treated as described above. The average flow rate through the 6 columns was between 165-170 gallons/hour. Thus, the total applied dose of UV-C energy was about 120 mJ/cm².

The results of a validated HACCP study (using *E. coli* ATCC 25922) will show that at least a 5 log reduction was obtained. The juice quality was not adversely affected. The desired color, aroma, and flavor was also obtained.

The juice was bottled as described above. A shelf-life study was then conducted. The shelf-life study demonstrated that the packaged juice had a shelf-life of at least 60 days.

Example 12

A juice was formulated according to Table 23 below.

TABLE 23

| Ingredients | Unit | Units for production (600) | 1 unit | % | Shelf-life (approx.) | Average Flow rate through 6 columns in series |
|---|---|---|---|---|---|---|
| Chaga | g | 3000 | 5 | 0.5 | 90 days | 121 ga/hr |
| Maple Syrup | Tbsp | 150 | 0.25 | 0.5 | | |
| R.O Water | oz | 9000 | 15 | 99 | | |

The juice was then treated as described above. The average flow rate through the 6 columns was about 120 gallons/hour. Thus, the total applied dose of UV-C energy was about 170 mJ/cm².

The results of a validated HACCP study (using *E. coli* ATCC 25922) will show that at least a 5 log reduction was obtained. The juice quality was not adversely affected. The desired color, aroma, and flavor was also obtained.

The juice was bottled as described above. A shelf-life study was then conducted. The shelf-life study demonstrated that the packaged juice had a shelf-life of at least 90 days.

Example 13

A tea was formulated according to Table 24 below.

TABLE 24

| Ingredients | Unit | Units for production (320) | 1 unit | % | Shelf-life (approx.) | Average Flow rate through 6 columns in series |
|---|---|---|---|---|---|---|
| Oolong | g | 1600 | 5 | 2 | 150 days | 115-162 ga/hr |
| R.O Water | oz | 4800 | 15 | 98 | | |

The tea was then treated as described above. The average flow rate through the 6 columns was between 115-162 gallons/hour. Thus, the total applied dose of UV-C energy was between about 125-175 mJ/cm$^2$.

The results of a validated HACCP study (using *E. coli* ATCC 25922) will show that at least a 5 log reduction was obtained. The beverage quality was not adversely affected. The desired color, aroma, and flavor was also obtained.

The beverage was bottled as described above. A shelf-life study was then conducted. The shelf-life study demonstrated that the packaged beverage had a shelf-life of at least 150 days.

Example 14

A tea was formulated according to Table 25 below.

TABLE 25

| Ingredients | Unit | Units for production (600) | 1 unit | % | Shelf-life (approx.) | Average Flow rate through 6 columns in series |
|---|---|---|---|---|---|---|
| Jasmine | g | 3000 | 5 | 1.5 | 60 days | 168 ga/hr |
| Maple Syrup | Tbsp | 150 | 0.25 | 0.5 | | |
| R.O Water | oz | 9000 | 15 | 98 | | |

The tea was then treated as described above. The average flow rate through the 6 columns was about 168 gallons/hour. Thus, the total applied dose of UV-C energy was about 120 mJ/cm$^2$.

The results of a validated HACCP study (using *E. coli* ATCC 25922) will show that at least a 5 log reduction was obtained. The beverage quality was not adversely affected. The desired color, aroma, and flavor was also obtained.

The beverage was bottled as described above. A shelf-life study was then conducted. The shelf-life study demonstrated that the packaged beverage had a shelf-life of at least 60 days.

Example 15

A tea was formulated according to Table 26 below.

TABLE 26

| Ingredients | Unit | Units for production (320) | 1 unit | % | Shelf-life (approx.) | Average Flow rate through 6 columns in series |
|---|---|---|---|---|---|---|
| Chai | g | 800 | 2.5 | 1.5 | 60 days | 124 ga/hr |
| Maple Syrup | Tbsp | 80 | 0.25 | 0.5 | | |
| R.O Water | oz | 4960 | 15.5 | 98 | | |

The tea was then treated as described above. The average flow rate through the 6 columns was about 124 gallons/hour. Thus, the total applied dose of UV-C energy was about 160 mJ/cm$^2$.

The results of a validated HACCP study (using *E. coli* ATCC 25922) will show that at least a 5 log reduction was obtained. The beverage quality was not adversely affected. The desired color, aroma and flavor was also obtained.

The beverage was bottled as described above. A shelf-life study was then conducted. The shelf-life study demonstrated that the packaged beverage had a shelf-life of at least 60 days.

Example 16

A juice was formulated according to Table 27 below.

TABLE 27

| Ingredients | Unit | Units for production (1) | % | Shelf-life (approx.) | Average Flow rate through 6 columns in series |
|---|---|---|---|---|---|
| Valencia Orange | lb | 2 | 100 | 35 days | About 80 gal/hr |

The juice was then treated as described above. The average flow rate through the 6 columns was about 80 gallons/hour. Thus, the total applied dose of UV-C energy was about 250 mJ/cm$^2$.

The results of a validated HACCP study (using *E. coli* ATCC 25922) will show that at least a 5 log reduction was obtained. The juice quality was not adversely affected. The desired color, aroma, and flavor was also obtained.

The juice was bottled as described above. A shelf-life study was then conducted. The shelf-life study demonstrated that the packaged juice had shelf-life of at least 39 days.

Example 17

A juice was formulated according to Table 28 below.

TABLE 28

| Ingredients | Unit | Units for production (1) | Unit | Shelf-life (approx.) | Average Flow rate through 6 columns in series |
|---|---|---|---|---|---|
| Lemon | oz | 0.26 | 25 | 35 days | 107-169 ga/hr |
| Mint | lb | 0.004 | 5 | | |
| Watermelon | lb | 1.6 | 70 | | |

The average flow rate through the 6 columns was about 105-170 gallons/hour. Thus, the total applied dose of UV-C energy was between about 120-200 mJ/cm$^2$.

The results of a validated HACCP study (using *E. coli* ATCC 25922) will show that at least a 5 log reduction was obtained. The juice quality was not adversely affected. The desired color, aroma, and flavor was also obtained.

The juice was bottled as described above. A shelf-life study was then conducted. The shelf-life study demonstrated that the packaged juice has a shelf-life of at least 35 days.

Alternatives

Accordingly, various alternative processes and systems are described herein.

1. A method of making and bottling a juice containing beverage in a sealed container without heat-based or pressure-based pasteurization, the method comprising:
   sterilizing at least one container;
   exposing a liquid to UV-C light such that at least a 5 log reduction in microbes is achieved, the liquid comprising at least 10% by volume of juice;
   depositing at least a portion of the liquid in the at least one container; and
   sealing the container;
   wherein the liquid is at a temperature of 50° F. or less during the entire method, and wherein the liquid in the sealed container has a shelf-life of at least 35 days when stored at or below 41° F.

2. The method of Alternative 1, wherein the liquid consists of 100% juice.

3. The method of Alternatives 1-2, wherein the liquid comprises no more than 30% by volume of apple cider.

4. The method of Alternatives 1-3, wherein the liquid comprises no more than 40% by volume of apple cider.

5. The method of Alternatives 1-4, wherein the liquid comprises at least 20% by volume of cucumber juice.

6. The method of Alternatives 1-5, wherein the liquid comprises no more than 20% by volume of juice from citrus fruits.

7. The method of Alternatives 1-6, wherein the liquid is at a temperature of about 45° F. or less during the entire method.

8. The method of Alternatives 1-7, wherein the liquid is at a temperature of about 41° F. or less during the entire method.

9. The method of Alternatives 1-8, wherein the liquid in the sealed container has a shelf-life of at least 40 days when stored at or below 41° F.

10. The method of Alternatives 1-9, wherein the liquid in the sealed container has a shelf-life of at least 50 days when stored at or below 41° F.

11. The method of Alternatives 1-10, wherein the liquid in the sealed container has a shelf-life of at least 90 days when stored at or below 41° F.

12. The method of Alternatives 1-11, wherein the liquid in the sealed container has a shelf-life of at least 100 days when stored at or below 41° F.

13. The method of Alternatives 1-12, wherein the liquid in the sealed container has a shelf-life of at least 150 days when stored at or below 41° F.

14. The method of Alternatives 1-13, wherein the sterilization is performed in a pressurized HEPA air filtered environment.

15. The method of Alternatives 1-14, wherein the depositing is performed in a pressurized HEPA air filtered environment.

16. The method of Alternatives 1-15, wherein the sealing comprises sealing the containers with screw top lids.

17. The method of Alternatives 1-16, further comprising sterilizing the lids without heat.

18. The method of Alternatives 1-17, further comprising dosing the portion of the liquid in the at least one container with liquid nitrogen prior to sealing the container.

19. The method of Alternatives 1-18, further comprising washing the at least container with RO water after sterilizing the container.

20. The method of Alternatives 1-19, wherein the liquid is exposed to at least 42 mJ/cm$^2$ of UV-C light.

21. The method of Alternatives 1-20, wherein the liquid is exposed to at least 56 mJ/cm$^2$ of UV-C light.

22. The method of Alternatives 1-21, wherein the liquid is exposed to at least 70 mJ/cm$^2$ of UV-C light.

23. The method of Alternatives 1-22 wherein the liquid is exposed to at least 84 mJ/cm$^2$ of UV-C light.

24. The method of Alternatives 1-23, wherein the liquid is exposed to at least 120 mJ/cm$^2$ of UV-C light.

25. The method of Alternatives 1-24, wherein the liquid is exposed to at least 160 mJ/cm$^2$ of UV-C light.

26. The method of Alternatives 1-25, wherein the liquid is exposed to at least 200 mJ/cm$^2$ of UV-C light.

27. The method of Alternatives 1-26, wherein the liquid is exposed to at least 250 mJ/cm$^2$ of UV-C light.

28. The method of Alternatives 1-27, wherein the liquid is exposed to at least 300 mJ/cm$^2$ of UV-C light.

29. The method of Alternatives 1-19, wherein the absorbed dose is between 20-150 mJ/cm$^2$ of UV-C light 30. The method of Alternatives 1-29, wherein the at least one container is sterilized without heating the container.

31. The method of Alternatives 1-30, wherein the at least one container comprises a rigid container that is not compatible with HPP.

32. The method of Alternatives 1-31, wherein the at least one container comprises a glass bottle.

33. A system for making and bottling a juice containing beverage in sealed containers without using heat-based or pressure-based pasteurization, the system comprising:
   at least one press configured to extract juice from fruits and vegetables;
   a UV-C treatment device, the device configured to expose extracted juices to an amount of UV-C light projected through the extracted juices and through a path length of no more than 2 mm, the amount sufficient to achieve a 5 log reduction in microbes; and
   an aseptic sterilization and bottling line, the aseptic sterilization and bottling line housed within a pressured and substantially sterile environment, the aseptic sterilization and bottling line configured to sterilize containers, deposit the extracted and UV treated juices in the containers, and cap the filled containers, the system configured such that the extracted liquid is kept at a temperature of 50° F. or less throughout the process.

34. The system of Alternative 33, where in the amount sufficient to achieve a 5 log reduction in microbes is an applied dose of at least 120 mJ/cm² of UV-C light.

35. The system of Alternative 33, where in the amount sufficient to achieve a 5 log reduction in microbes is an applied dose of at least 200 mJ/cm² of UV-C light.

36. The system of Alternative 33, where in the amount sufficient to achieve a 5 log reduction in microbes is an applied dose of at least 400 mJ/cm² of UV-C light.

37. The system of Alternative 33, the extracted liquid is kept at a temperature of 45° F. or less throughout the process.

38. The system of Alternative 33, the extracted liquid is kept at a temperature of 41° F. or less throughout the process.

39. The system of Alternative 33, wherein the aseptic sterilization and bottling line further is further configured to deposit a dose of liquid nitrogen into the containers prior to capping the glass bottles.

40. A method of making and bottling a juice containing beverage in a sealed glass container without heat-based or pressure-based pasteurization, the method comprising:
sterilizing at least one glass bottle;
exposing a liquid to UV-C light such that at least a 5 log reduction in microbes is achieved, the liquid comprising no more than 40% apple cider, at least 20% cucumber juice, and at least 1% kale juice;
depositing at least a portion of the liquid in the at least one glass bottle; and
sealing the glass bottle;
wherein the liquid is at a temperature of 50° F. or less during the entire method, and wherein the liquid in the sealed bottle has a shelf-life of at least 30 days when stored at or below 41° F.

41. The method of Alternative 40, wherein the liquid consists of 100% juice.

42. The method of Alternatives 40-41, wherein the liquid comprises at least 10% kale juice.

43. The method of Alternatives 40-42, wherein the liquid comprises at least 10% spinach juice.

44. The method of Alternatives 40-43, wherein the liquid comprises no more than 10% citrus juice.

45. The method of Alternatives 40-44, wherein the exposing a liquid to UV-C light step comprises exposing a flowing liquid to a UV-C dose of at least 60 mJ/cm² and wherein the flowing liquid has a Reynolds number of at least 2,200.

What is claimed is:

1. A method of making and bottling a juice containing beverage in a sealed container without heat-based or pressure-based pasteurization, the method comprising:
sterilizing at least one glass container;
exposing a liquid to UV-C light such that at least a 5 log reduction in microbes is achieved, the liquid comprising at least 10% by volume of cold-pressed, unaltered juice, wherein the liquid comprises a first amount of phenolic acids before exposure to UV-C light and a second amount of phenolic acids after exposure to UV-C light;
depositing at least a portion of the liquid in the at least one container; and
sealing the container;
wherein the depositing and sealing are completed under aseptic conditions and performed in a pressurized HEPA air filtered environment,
wherein the liquid is at a temperature of 50° F. or less during the entire method,
wherein the liquid in the sealed container has a shelf-life of at least 35 days when stored at or below 41° F.,
wherein the second amount of phenolic acid is at least about 90% of the first amount of phenolic acid,
wherein the liquid comprises cold-pressed, unaltered lemon juice,
wherein the liquid is exposed to UV-C light through 6 columns connected in series,
wherein the liquid is exposed to UV-C light at an average flow rate of about 60-122 gallons/hour, and
wherein the liquid is exposed to UV-C light at an exposure level of about 12-15 mJ/cm² per column.

2. The method of claim 1, wherein the liquid consists of 100% cold-pressed, unaltered juice.

3. The method of claim 1, wherein the liquid comprises no more than 30% by volume of apple cider.

4. The method of claim 1, wherein the liquid comprises no more than 40% by volume of apple cider.

5. The method of claim 1, wherein the liquid comprises at least 20% by volume of cold-pressed, unaltered cucumber juice.

6. The method of claim 1, wherein the liquid comprises no more than 20% by volume of cold-pressed, unaltered juice from citrus fruits.

7. The method of claim 1, wherein the liquid is at a temperature of about 45° F. or less during the entire method.

8. The method of claim 7, wherein the liquid is at a temperature of about 41° F. or less during the entire method.

9. The method of claim 1, wherein the liquid in the sealed container has a shelf-life of at least 40 days when stored at or below 41° F.

10. The method of claim 9, wherein the liquid in the sealed container has a shelf-life of at least 50 days when stored at or below 41° F.

11. The method of claim 10, wherein the liquid in the sealed container has a shelf-life of at least 90 days when stored at or below 41° F.

12. The method of claim 11, wherein the liquid in the sealed container has a shelf-life of at least 100 days when stored at or below 41° F.

13. The method of claim 12, wherein the liquid in the sealed container has a shelf-life of at least 150 days when stored at or below 41° F.

14. The method of claim 1, wherein the sterilization is performed in a pressurized HEPA air filtered environment.

15. The method of claim 1, wherein the sealing comprises sealing the containers with screw top lids.

16. The method of claim 1, further comprising sterilizing the lids without heat.

17. The method of claim 1, further comprising dosing the portion of the liquid in the at least one container with liquid nitrogen prior to sealing the container.

18. The method of claim 1, further comprising rinsing the at least container with reverse osmosis water after sterilizing the container.

19. The method of claim 1, wherein the cold-pressed, unaltered juice does not comprise an additive.

20. The method of claim 1, wherein the liquid comprises added water.

* * * * *